United States Patent
Nam et al.

(10) Patent No.: US 11,563,541 B2
(45) Date of Patent: Jan. 24, 2023

(54) RESOURCE MAPPING FOR BROADCASTED SYSTEM INFORMATION

(71) Applicant: QUALCOMM incorporated, San Diego, CA (US)

(72) Inventors: Wooseok Nam, San Diego, CA (US); Tao Luo, San Diego, CA (US); Hung Dinh Ly, San Diego, CA (US); Heechoon Lee, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/408,241

(22) Filed: May 9, 2019

(65) Prior Publication Data

US 2019/0349149 A1    Nov. 14, 2019

Related U.S. Application Data

(60) Provisional application No. 62/673,799, filed on May 18, 2018, provisional application No. 62/670,247, filed on May 11, 2018.

(51) Int. Cl.
*H04L 12/26* (2006.01)
*H04L 5/00* (2006.01)
*H04W 48/10* (2009.01)
*H04W 72/12* (2009.01)

(52) U.S. Cl.
CPC .......... *H04L 5/005* (2013.01); *H04L 5/0007* (2013.01); *H04W 48/10* (2013.01); *H04W 72/1289* (2013.01)

(58) Field of Classification Search
USPC .... 370/229, 230, 230.1, 236, 252, 328, 329, 370/330, 410, 436, 437, 465, 468, 522
See application file for complete search history.

(56) References Cited

U.S. PATENT DOCUMENTS

| 2014/0086113 A1* | 3/2014 | Ji ......................... H04L 1/1896 370/280 |
| 2015/0131599 A1* | 5/2015 | Xue .................... H04W 72/042 370/329 |

(Continued)

OTHER PUBLICATIONS

Ericsson: "On Other System Information Delivery", 3GPP Draft; R1-1805218 on Other System Information Delivery, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 3 Pages, XP051427463, Retrieved from the Internet: URL: http://www.3gpp.org/ftp/Meetings_3GPP_SYNC/RAN1/Docs/[retrieved on Apr. 15, 2018], Section 2.1.
International Search Report and Written Opinion—PCT/US2019/031837—ISA/EPO—Aug. 19, 2019 (183280WO).

(Continued)

*Primary Examiner* — Nguyen H Ngo
(74) *Attorney, Agent, or Firm* — Holland & Hart LLP

(57) ABSTRACT

Methods, systems, and devices for wireless communications are described. A wireless device, such as a user equipment (UE), may receive a message that includes downlink control information (DCI) pertaining to system information that is scheduled to be received from a base station. The UE may determine, based at least in part on the message, whether the system information that is scheduled is remaining minimum system information (RMSI) or is other system information (OSI), and searching a downlink bandwidth part for the scheduled RMSI or OSI determined from the message. The described techniques may serve to resolve ambiguity between RMSI and OSI, for instance, when scheduled in the same control region and having overlapping search spaces.

16 Claims, 18 Drawing Sheets

(56) References Cited

U.S. PATENT DOCUMENTS

| | | | | |
|---|---|---|---|---|
| 2018/0054275 | A1* | 2/2018 | Kimura | H04J 15/00 |
| 2018/0092122 | A1* | 3/2018 | Babaei | H04W 72/042 |
| 2019/0200307 | A1* | 6/2019 | Si | H04L 27/2666 |
| 2019/0215101 | A1* | 7/2019 | Ko | H04L 1/1819 |
| 2019/0313377 | A1* | 10/2019 | Abdoli | H04L 1/0071 |
| 2019/0320455 | A1* | 10/2019 | Chen | H04W 76/50 |
| 2019/0357185 | A1* | 11/2019 | Kwak | H04L 1/0075 |
| 2019/0379487 | A1* | 12/2019 | Hwang | H04L 1/0061 |
| 2020/0288334 | A1* | 9/2020 | Takeda | H04W 24/04 |
| 2020/0344671 | A1* | 10/2020 | He | H04W 48/08 |

OTHER PUBLICATIONS

LG Electronics: "Other System Information Delivery", 3GPP Draft; R1-1804536 LG_OSI Delivery, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 3 Pages, XP051426805, Retrieved from the Internet: URL: http://www.3gpp.org/ftp/Meetings_3GPP_SYNC/RAN1/Docs/ [retrieved on Apr. 15, 2018], Section 2.

Nokia et al., "On BWP for Other System Information Delivery", 3GPP Draft; R1-1805137, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 6 Pages, XP051427393, Retrieved from the Internet: URL: http://www.3gpp.org/ftp/Meetings_3GPP_SYNC/RAN1/Docs/ [retrieved on Apr. 15, 2018], Section 2.

* cited by examiner

RESOURCE MAPPING FOR BROADCASTED SYSTEM INFORMATION

CROSS REFERENCE

The present Application for Patent claims the benefit of U.S. Provisional Patent Application No. 62/670,247 by NAM et al., entitled "Resource Mapping For Broadcasted System Information," filed May 11, 2018, and claims the benefit of U.S. Provisional Patent Application No. 62/673,799 by NAM et al., entitled "Resource Broadcasted System Information" filed May 18, 2018, assigned to the assignee hereof, and expressly incorporated herein.

BACKGROUND

The following relates generally to wireless communications, and more specifically to resource mapping for broadcasted system information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may configure a control resource set (CORESET) associated with search spaces for transmission of control information (e.g., downlink control information (DCI)) to a UE on a downlink control channel. In some cases, the DCI obtained within a CORESET and a search space may be used to indicate the resources on which certain types of system information may be received over a downlink shared channel. For example, the DCI may indicate downlink shared channel resources on which Remaining Minimum System Information (RMSI), or Other System Information (OSI) may be received. Further, RMSI and OSI may be scheduled in the same or different regions of a downlink bandwidth part. In some cases, ambiguities may arise due to the CORESET, search spaces, and the scheduled regions for RMSI and OSI overlapping in time. In such circumstances, a UE may experience difficulty differentiating between different types of broadcasted system information (e.g., RMSI and OSI), and thus, may be unable to successfully monitor and receive important changes in system information, impacting UE performance.

SUMMARY

The described techniques relate to improved methods, systems, devices, and apparatuses that support resource mapping for broadcasted system information. A wireless device, such as a user equipment (UE), may be configured by a base station. The UE may receive from the base station an identification of a control resource set (CORESET) associated with search spaces for reception of control information and/or system information on a downlink control channel. In some cases, system information, such as Remaining Minimum System Information (RMSI), or Other System Information (OSI) may be carried over a downlink shared channel scheduled within an initial active downlink (DL) bandwidth part (BWP). In some cases, the scheduled regions for RMSI and OSI may be configured using a same type of downlink control channel, and may overlap in time. In such cases, ambiguity may arise since the UE may search for both RMSI and OSI within the scheduled region, and may be unable to distinguish them based on the scheduling downlink control information (DCI).

In some examples, a base station may add a bit field in the scheduling DCI such that the UE may be able to identify whether the DCI pertains to RMSI and OSI, as indicated by the value of the added bit field. In some other cases, an existing bit field in the scheduling DCI may be reused to identify whether the DCI pertains to RMSI and OSI. In some other cases, the base station may utilize different System Information Radio Network Temporary Identifiers (SI-RNTIs) to scramble the DCI message, with the different SI-RNTIs pertaining to RMSI or OSI, respectively. In some examples, the UE may perform blind detection using at least two sequence (e.g., demodulation reference signal (DMRS) sequences) hypotheses. Additionally or alternatively, a base station may use different DMRS sequence initialization values for RMSI and OSI. In some cases, different DMRS ports and/or DMRS tone locations may be used for RMSI and OSI. In some examples, interleaved mapping may be enabled or disabled for transmission of system information, based in part on the RMSI and OSI using the same or different resource grids. In some cases, controlling whether the system information will be received via interleaved mapping may serve to reduce ambiguities between RMSI and OSI.

A method of wireless communication is described. The method may include receiving a message that includes DCI pertaining to system information that is scheduled to be received, determining, based on the message, that the system information that is scheduled is one of remaining minimum system information (RMSI) or other system information (OSI), and searching a downlink bandwidth part for the scheduled one of RMSI or OSI determined from the message.

An apparatus for wireless communication is described. The apparatus may include a processor, memory in electronic communication with the processor, and instructions stored in the memory. The instructions may be executable by the processor to cause the apparatus to receive a message that includes DCI pertaining to system information that is scheduled to be received, determine, based on the message, that the system information that is scheduled is one of remaining minimum system information (RMSI) or other system information (OSI), and search a downlink bandwidth part for the scheduled one of RMSI or OSI determined from the message.

Another apparatus for wireless communication is described. The apparatus may include means for receiving a message that includes DCI pertaining to system information that is scheduled to be received, determining, based on the message, that the system information that is scheduled is one of remaining minimum system information (RMSI) or other system information (OSI), and searching a downlink bandwidth part for the scheduled one of RMSI or OSI determined from the message.

A non-transitory computer-readable medium storing code for wireless communication is described. The code may include instructions executable by a processor to receive a message that includes DCI pertaining to system information that is scheduled to be received, determine, based on the message, that the system information that is scheduled is one of remaining minimum system information (RMSI) or other system information (OSI), and search a downlink bandwidth part for the scheduled one of RMSI or OSI determined from the message.

In some examples of the method, apparatuses, and non-transitory computer-readable medium described herein, determining that the system information may be the one of RMSI or OSI may include operations, features, means, or instructions for receiving, in the DCI, an indication that the DCI pertains to the one of RMSI or OSI.

In some examples of the method, apparatuses, and non-transitory computer-readable medium described herein, the indication may be a bit field.

In some examples of the method, apparatuses, and non-transitory computer-readable medium described herein, the bit field may be a modulation and coding scheme (MCS) field.

In some examples of the method, apparatuses, and non-transitory computer-readable medium described herein, determining that the system information may be the one of RMSI or OSI may include operations, features, means, or instructions for unscrambling the message using a system information radio network temporary identifier (SI-RNTI) of a set of SI-RNTIs, and determining from the SI-RNTI used to unscramble the message, that the DCI pertains to the one of RMSI or OSI.

Some examples of the method, apparatuses, and non-transitory computer-readable medium described herein may further include operations, features, means, or instructions for receiving, in the DCI, an indication that the system information may be to be received via an interleaved mapping, where the system information may be mapped to a same resource grid regardless of whether the system information may be RMSI or OSI.

Some examples of the method, apparatuses, and non-transitory computer-readable medium described herein may further include operations, features, means, or instructions for receiving, in the DCI, an indication that the system information may be to be received without an interleaved mapping, where the system information may be mapped to a different resource grid depending on the system information being the one of RMSI or OSI.

In some examples of the method, apparatuses, and non-transitory computer-readable medium described herein, receiving the message that includes the DCI pertaining to system information may include operations, features, means, or instructions for receiving the message as part of a procedure to update already received system information.

A method of wireless communication is described. The method may include transmitting a message that includes DCI pertaining to system information that is scheduled to be transmitted, indicating, via the message, that the system information that is scheduled is one of remaining minimum system information (RMSI) or other system information (OSI), and transmitting the one of RMSI or OSI in accordance with the message.

An apparatus for wireless communication is described. The apparatus may include a processor, memory in electronic communication with the processor, and instructions stored in the memory. The instructions may be executable by the processor to cause the apparatus to transmit a message that includes DCI pertaining to system information that is scheduled to be transmitted, indicate, via the message, that the system information that is scheduled is one of remaining minimum system information (RMSI) or other system information (OSI), and transmit the one of RMSI or OSI in accordance with the message.

Another apparatus for wireless communication is described. The apparatus may include means for transmitting a message that includes DCI pertaining to system information that is scheduled to be transmitted, indicating, via the message, that the system information that is scheduled is one of remaining minimum system information (RMSI) or other system information (OSI), and transmitting the one of RMSI or OSI in accordance with the message.

A non-transitory computer-readable medium storing code for wireless communication is described. The code may include instructions executable by a processor to transmit a message that includes DCI pertaining to system information that is scheduled to be transmitted, indicate, via the message, that the system information that is scheduled is one of remaining minimum system information (RMSI) or other system information (OSI), and transmit the one of RMSI or OSI in accordance with the message.

In some examples of the method, apparatuses, and non-transitory computer-readable medium described herein, indicating that the system information may be the one of RMSI or OSI may include operations, features, means, or instructions for transmitting, in the DCI, an indication that the DCI pertains to the one of RMSI or OSI.

In some examples of the method, apparatuses, and non-transitory computer-readable medium described herein, the indication may be a bit field.

In some examples of the method, apparatuses, and non-transitory computer-readable medium described herein, the bit field may be a modulation and coding scheme (MCS) field.

In some examples of the method, apparatuses, and non-transitory computer-readable medium described herein, indicating that the system information may be the one of RMSI or OSI may include operations, features, means, or instructions for scrambling the message using a system information radio network temporary identifier (SI-RNTI) that may be unique based on the system information being the one of RMSI or OSI.

Some examples of the method, apparatuses, and non-transitory computer-readable medium described herein may further include operations, features, means, or instructions for determining that the system information may be to be mapped to a same resource grid, regardless of whether the system information may be RMSI or OSI.

Some examples of the method, apparatuses, and non-transitory computer-readable medium described herein may further include operations, features, means, or instructions for determining, based on the RMSI and the OSI using the same resource grid, to use an interleaved mapping for transmission of the system information, and transmitting, in the DCI, an indication that the system information may be to be transmitted via the interleaved mapping.

Some examples of the method, apparatuses, and non-transitory computer-readable medium described herein may further include operations, features, means, or instructions for identifying a reference point for RB bundling for the system information, where the reference point may be a lowest numbered RB in an initial active bandwidth part regardless of whether the system information may be RMSI or OSI.

Some examples of the method, apparatuses, and non-transitory computer-readable medium described herein may further include operations, features, means, or instructions for determining that the system information may be to be mapped to a different resource grid depending on the system information being the one of RMSI or OSI.

Some examples of the method, apparatuses, and non-transitory computer-readable medium described herein may further include operations, features, means, or instructions for determining, based on the RMSI and the OSI using different resource grids, to use a non-interleaved mapping for transmission of the system information, and transmitting, in the DCI, an indication that the system information may be to be transmitted via the non-interleaved mapping.

Some examples of the method, apparatuses, and non-transitory computer-readable medium described herein may further include operations, features, means, or instructions for identifying a reference point for RB bundling for the system information, where the reference point may be a lowest numbered RB in an initial active bandwidth part when the system information may be RMSI.

Some examples of the method, apparatuses, and non-transitory computer-readable medium described herein may further include operations, features, means, or instructions for identifying a reference point for RB bundling for the system information, where the reference point may be a common RB 0 when the system information may be OSI.

Some examples of the method, apparatuses, and non-transitory computer-readable medium described herein may further include operations, features, means, or instructions for forcing a reference point for RB bundling for OSI to be a same reference point as that used for RB bundling for RMSI, and determining, based on the RMSI and the OSI using the same reference point for RB bundling, to use an interleaved mapping for transmission of the system information.

In some examples of the method, apparatuses, and non-transitory computer-readable medium described herein, transmitting the message that includes DCI pertaining to system information that may be scheduled to be transmitted may include operations, features, means, or instructions for transmitting the message as part of a procedure to update already transmitted system information.

A method of wireless communication is described. The method may include receiving a message that includes DCI pertaining to system information that is scheduled to be received, determining that the system information that is scheduled is one of remaining minimum system information (RMSI) or other system information (OSI) by blindly testing one or more decoding hypotheses, and receiving the one of RMSI or OSI, as scheduled by the DCI.

An apparatus for wireless communication is described. The apparatus may include a processor, memory in electronic communication with the processor, and instructions stored in the memory. The instructions may be executable by the processor to cause the apparatus to receive a message that includes DCI pertaining to system information that is scheduled to be received, determine that the system information that is scheduled is one of remaining minimum system information (RMSI) or other system information (OSI) by blindly testing one or more decoding hypotheses, and receive the one of RMSI or OSI, as scheduled by the DCI.

Another apparatus for wireless communication is described. The apparatus may include means for receiving a message that includes DCI pertaining to system information that is scheduled to be received, determining that the system information that is scheduled is one of remaining minimum system information (RMSI) or other system information (OSI) by blindly testing one or more decoding hypotheses, and receiving the one of RMSI or OSI, as scheduled by the DCI.

A non-transitory computer-readable medium storing code for wireless communication is described. The code may include instructions executable by a processor to receive a message that includes DCI pertaining to system information that is scheduled to be received, determine that the system information that is scheduled is one of remaining minimum system information (RMSI) or other system information (OSI) by blindly testing one or more decoding hypotheses, and receive the one of RMSI or OSI, as scheduled by the DCI.

In some examples of the method, apparatuses, and non-transitory computer-readable medium described herein, determining that the system information may be the one of RMSI or OSI may include operations, features, means, or instructions for testing different decoding hypotheses based on different demodulation reference signal (DMRS) sequences associated for transmission of RMSI and for transmission of OSI.

In some examples of the method, apparatuses, and non-transitory computer-readable medium described herein, the different DMRS sequences include different sequence initialization values based on the system information being the one of RMSI or OSI.

In some examples of the method, apparatuses, and non-transitory computer-readable medium described herein, determining that the system information may be RMSI or OSI may include operations, features, means, or instructions for testing different decoding hypotheses based on different ports being used for transmission of RMSI and for transmission of OSI.

Some examples of the method, apparatuses, and non-transitory computer-readable medium described herein may further include operations, features, means, or instructions for receiving, in the DCI, an indication that the system information may be to be received via an interleaved mapping, where the system information may be mapped to a same resource grid regardless of whether the system information may be RMSI or OSI.

Some examples of the method, apparatuses, and non-transitory computer-readable medium described herein may further include operations, features, means, or instructions for receiving, in the DCI, an indication that the system information may be to be received without an interleaved mapping, where the system information may be mapped to a different resource grid depending on the system information being the one of RMSI or OSI.

In some examples of the method, apparatuses, and non-transitory computer-readable medium described herein, receiving the message that includes DCI pertaining to system information may include operations, features, means, or instructions for receiving the message as part of a procedure to update already received system information.

A method of wireless communication is described. The method may include transmitting a message that includes DCI pertaining to system information that is scheduled to be transmitted, indicating that the system information that is scheduled is one of remaining minimum system information (RMSI) or other system information (OSI) by using at least one of different demodulation reference signal (DMRS) sequences associated with the system information or different ports for transmission of the system information, and transmitting the one of the RMSI or OSI using the at least one of different DMRS sequences or different ports.

An apparatus for wireless communication is described. The apparatus may include a processor, memory in electronic communication with the processor, and instructions stored in the memory. The instructions may be executable by the processor to cause the apparatus to transmit a message that includes DCI pertaining to system information that is scheduled to be transmitted, indicate that the system information that is scheduled is one of remaining minimum system information (RMSI) or other system information (OSI) by using at least one of different demodulation reference signal (DMRS) sequences associated with the system information or different ports for transmission of the system information, and transmit the one of the RMSI or OSI using the at least one of different DMRS sequences or different ports.

Another apparatus for wireless communication is described. The apparatus may include means for transmitting a message that includes DCI pertaining to system information that is scheduled to be transmitted, indicating that the system information that is scheduled is one of remaining minimum system information (RMSI) or other system information (OSI) by using at least one of different demodulation reference signal (DMRS) sequences associated with the system information or different ports for transmission of the system information, and transmitting the one of the RMSI or OSI using the at least one of different DMRS sequences or different ports.

A non-transitory computer-readable medium storing code for wireless communication is described. The code may include instructions executable by a processor to transmit a message that includes DCI pertaining to system information that is scheduled to be transmitted, indicate that the system information that is scheduled is one of remaining minimum system information (RMSI) or other system information (OSI) by using at least one of different demodulation reference signal (DMRS) sequences associated with the system information or different ports for transmission of the system information, and transmit the one of the RMSI or OSI using the at least one of different DMRS sequences or different ports.

In some examples of the method, apparatuses, and non-transitory computer-readable medium described herein, the different DMRS sequences include different sequence initialization values based on the system information being the one of RMSI or OSI.

Some examples of the method, apparatuses, and non-transitory computer-readable medium described herein may further include operations, features, means, or instructions for determining that the system information may be to be mapped to a same resource grid, regardless of whether the system information may be RMSI or OSI.

Some examples of the method, apparatuses, and non-transitory computer-readable medium described herein may further include operations, features, means, or instructions for determining, based on the RMSI and the OSI using the same resource grid, to use an interleaved mapping for transmission of the system information, and transmitting, in the DCI, an indication that the system information may be to be transmitted via the interleaved mapping.

Some examples of the method, apparatuses, and non-transitory computer-readable medium described herein may further include operations, features, means, or instructions for identifying a reference point for RB bundling for the system information, where the reference point may be a lowest numbered RB in an initial active bandwidth part regardless of whether the system information may be RMSI or OSI.

Some examples of the method, apparatuses, and non-transitory computer-readable medium described herein may further include operations, features, means, or instructions for determining that the system information may be to be mapped to a different resource grid depending on the system information being the one of RMSI or OSI.

Some examples of the method, apparatuses, and non-transitory computer-readable medium described herein may further include operations, features, means, or instructions for determining, based on the RMSI and the OSI using different resource grids, to use a non-interleaved mapping for transmission of the system information, and transmitting, in the DCI, an indication that the system information may be to be transmitted via the non-interleaved mapping.

Some examples of the method, apparatuses, and non-transitory computer-readable medium described herein may further include operations, features, means, or instructions for identifying a reference point for RB bundling for the system information, where the reference point may be a lowest numbered RB in an initial active bandwidth part when the system information may be RMSI.

Some examples of the method, apparatuses, and non-transitory computer-readable medium described herein may further include operations, features, means, or instructions for identifying a reference point for RB bundling for the system information, where the reference point may be a common RB 0 when the system information may be OSI.

Some examples of the method, apparatuses, and non-transitory computer-readable medium described herein may further include operations, features, means, or instructions for forcing a reference point for RB bundling for OSI to be a same reference point as that used for RB bundling for RMSI, and determining, based on the RMSI and the OSI using the same reference point for RB bundling, to use an interleaved mapping for transmission of the system information.

In some examples of the method, apparatuses, and non-transitory computer-readable medium described herein, transmitting the message that includes DCI pertaining to system information that may be scheduled to be transmitted may include operations, features, means, or instructions for transmitting the message as part of a procedure to update already transmitted system information.

DETAILED DESCRIPTION

Figure 1:
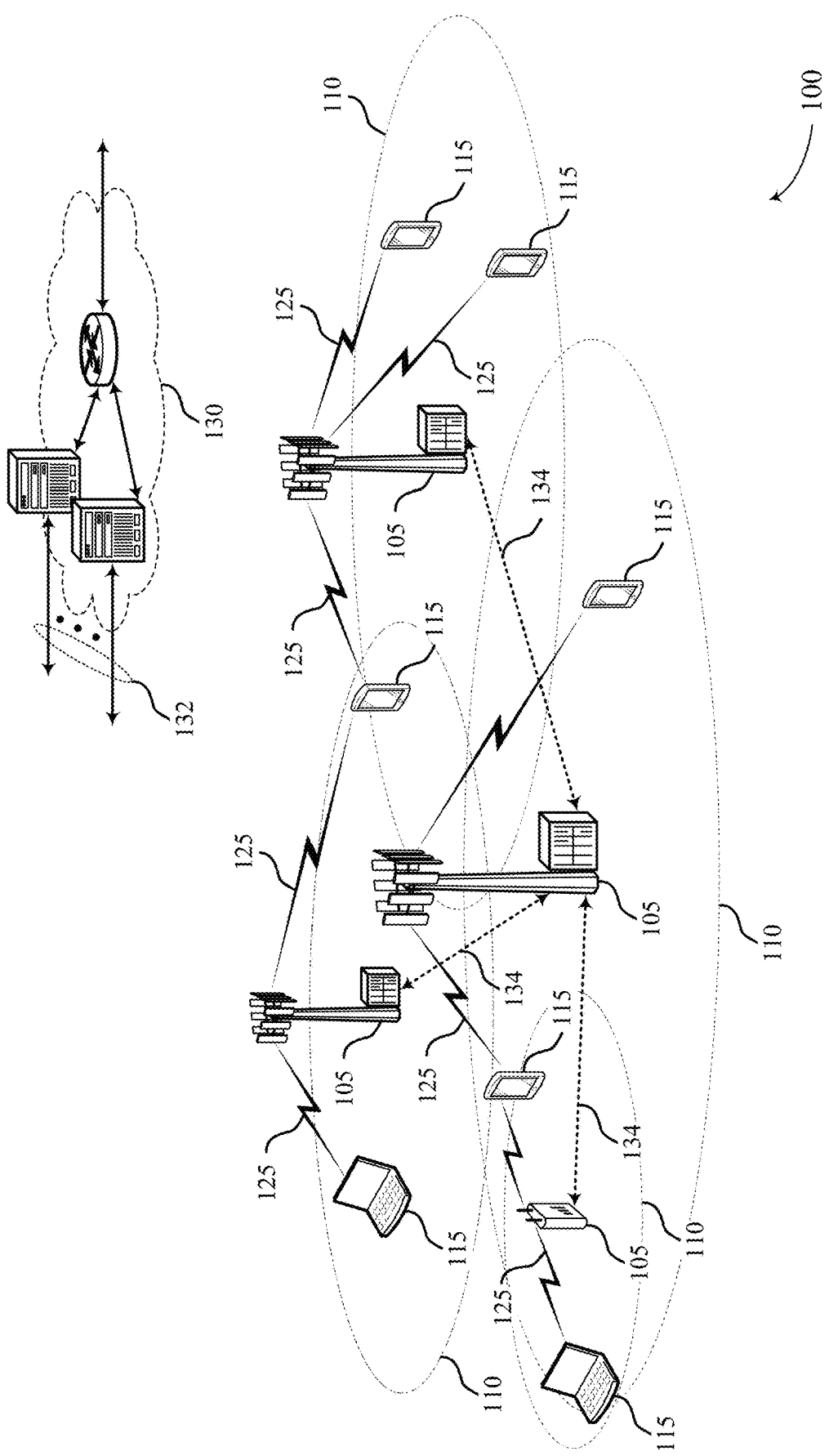
FIGS. 1 and 2 illustrate examples of systems for wireless communications that support resource mapping for broadcasted system information in accordance with aspects of the present disclosure.

In some wireless communications systems, a base station may transmit control information to a user equipment (UE) or a group of UEs via a downlink transmission. The UEs may use the downlink control information (DCI) to support communications with the base station. In some cases, the base station may configure a control resource set (CORESET) associated with search spaces for transmission of DCI to the UE on a downlink control channel, such as a physical downlink control channel (PDCCH), or New Radio (NR) PDCCH (NR-PDCCH). In some cases, a CORESET may comprise a plurality of resource blocks (RBs) in frequency domain, and one or more Orthogonal Frequency Division Multiplexed (OFDM) symbols in time domain. In some cases, the possible locations for the DCI may differ depending on the configured CORESET, for example, whether the search space is UE-specific or common. In some cases, a pre-defined duration (e.g., a slot) may comprise none, or, one or more control regions. Further, the same CORESET may be monitored in different control regions (e.g., different slots, mini-slots, etc.).

In some cases, the DCI obtained within the CORESET, such as CORESET0, may be used to schedule Remaining Minimum System Information (RMSI) or Other System Information (OSI). Furthermore, the CORESET0 may be configured via a Master Information Block (MIB) transmitted using a Physical Broadcast Channel (PBCH). In some aspects, the search space for RMSI PDCCH may be configured by the PBCH, and may be a common search space (CSS), such as Type0—CSS. Furthermore, the search space for OSI PDCCH may be configured via the RMSI, and may be a Type0A—CSS. In some cases, the PDCCH carrying the one or more scheduling DCIs for RMSI and OSI may arrive in the same time occasion, or different time occasions (i.e., different PDCCH monitoring occasions). In some cases, RMSI and OSI may be carried over a downlink shared channel, such as a Physical Downlink Shared Channel (PDSCH) or NR-PDSCH, which may be scheduled within a subset of the downlink bandwidth part. In some cases, this bandwidth may be the same as the bandwidth of CORESET0 configured by PBCH, and referred to as initial active downlink (DL) bandwidth part (BWP).

In some cases, RMSI and OSI may use different reference points for sequence mapping of reference signals, such as a PDSCH Demodulation Reference Signal (DMRS). In some examples, a subcarrier with index 0 in a lowest numbered common resource block (RB) in CORESET0 may be used as the reference point for RMSI, while a subcarrier with index 0 in a common RB 0 may be used as the reference point for OSI. In some cases, RMSI and OSI may include DMRS sequences mapped in frequency. Further, subcarrier 0 of common RB0 may be used as a reference point for DMRS sequence mapping for OSI, and may be referred to as reference point A, while the offset between subcarrier 0 of CORESET0, and reference point A may be referred to as offset B.

In some cases, reference points may be defined differently for RMSI and OSI resource grids. In some cases, resource grids for interleaved mapping of RMSI and OSI may be different, for example, based on RB allocation mapping in Virtual RB (VRB) domain and Physical RB (PRB) domain. In some cases, partial RB bundles (i.e., a bundle comprising a smaller number of RBs as compared to other bundles) may be supported for OSI RBs. It should be noted that one or both of interleaved and non-interleaved resource mapping techniques may be used for RMSI and OSI. In some cases, the scheduling DCI may provide a bit flag VRB-to-PRB mapping indicating the selection.

In some cases, the scheduling regions for RMSI and OSI may be configured separately (i.e., no overlap in time). In some cases, however, the scheduling regions for RMSI and OSI may overlap in time. In such cases, ambiguity may arise, since the UE may search for both RMSI and OSI within the overlapping scheduling regions contained in the initial active DL BWP. For instance, the RMSI and OSI may be carried in PDSCH signals, and may be carried on overlapping time and frequency resources identified by the DCI. In some cases, the UE may be unable to decode them, or distinguish them from each other. In some cases, the scheduling regions may also overlap in time with search spaces, or CORESET0, and the UE may be unable to distinguish the RMSI and/or OSI from DCI. Additionally or alternatively, RMSI and OSI ambiguity may arise in part due to different PDSCH DMRS sequences (i.e., reference point selection for DMRS sequence mapping), or different resource grids for interleaved mapping, both of which may impact PDSCH decoding.

In order to reduce the ambiguities involved in reception of RMSI and OSI, a base station may introduce ways to help the UE to distinguish between RMSI and OSI. For instance, the base station may add a bit field in the scheduling DCI such that the RMSI and OSI may be distinguished by the value of the added bit field. In some other cases, the base station may utilize different System Information Radio Network Temporary Identifiers (SI-RNTIs) for scrambling DCI messages pertaining to RMSI and OSI.

In some cases, an existing bit field in the scheduling DCI may be utilized (i.e., reconfigured or reused) to identify whether the DCI pertains to RMSI and OSI. For example, in NR, a Modulation and Coding Scheme (MCS) indication field of length one or more bits (e.g., 5 bits) may be included in the scheduling DCI. A value of the MCS indication field may be mapped to an element in a MCS table, which may define different combinations of modulation order (e.g., Quadrature Phase Shift Keying (QPSK), 16 Quadrature Amplitude Modulation (16 QAM), 64 QAM, and 256 QAM) and coding rate. In some cases, the broadcasted system information (i.e., RMSI or OSI) may utilize low modulation orders (e.g., QPSK). Thus, higher order modulations such as 16 QAM, 64 QAM, 256 QAM, etc. in the MCS table may not be used. In such cases, unused entries may be reused, or reconfigured to identify RMSI and OSI. For instance, in some cases, only 4 (four) least significant bits (LSBs) in the MCS indication field may be used for broadcasted system information, while the 1 (one) most significant bit (MSB) in the MCS indication field may be used to distinguish RMSI and OSI. In some other examples, one or more other existing fields may be used in a similar manner.

In some examples, the UE may perform blind detection with two or more PDSCH DMRS sequence hypotheses, based in part on the reference points for RMSI and OSI not coinciding. Additionally or alternatively, the base station may use different DMRS sequence initialization values for RMSI and OSI. In some cases, different DMRS ports and/or DMRS tone locations may also be used for RMSI and OSI. In some cases, RMSI and OSI may use the same resource grid for defining interleaving resource bundles (i.e., no partial bundling). For instance, the base station may force a reference point for RB bundling for OSI to be a same reference point as that used for RB bundling for RMSI. In some other cases, the reference point for RB bundling for RMSI may be chosen to be a lowest numbered RB in an initial active BWP, whereas the reference point for RB bundling for OSI may be chosen to be a common RB 0. In some cases, interleaved mapping may be disabled altogether, based in part on RMSI and OSI using different interleaving grids, and the RMSI and OSI not distinguished by the DCI.

Aspects of the disclosure are initially described in the context of wireless communications systems. Aspects of the disclosure are further illustrated by and described with reference to procedures, mapping schemes, process flows, apparatus diagrams, system diagrams, and flowcharts that relate to resource mapping for broadcasted system information.

FIG. 1 illustrates an example of a wireless communications system 100 that supports resource mapping for broadcasted system information in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a base station 105 may configure a CORESET (e.g., CORESET0) associated with search spaces for transmission of control information (e.g., DCI) to a UE 115 on a downlink control channel, such as a PDCCH, or NR-PDCCH. In some cases, the possible locations for the DCI may differ depending on the configured CORESET, for example, whether the search space is a UE-specific search space, or a common search space. In some cases, a predefined duration (e.g., a slot) may comprise none, or, one or more control regions. In some examples, a CORESET may be monitored over different control regions (e.g., different slots, mini-slots, etc.). In some cases, the DCI obtained within CORESET0 may be used to schedule RMSI or OSI. Furthermore, RMSI and OSI may be scheduled over the same, or different resources identified within an initial active DL BWP, and by a same, or different PDCCH monitoring occasion. In some cases, RMSI and OSI may be carried over a downlink shared channel, such as PDSCH.

In some cases, the scheduling regions for RMSI and OSI may be separately scheduled (i.e., no overlap in time) via PDCCH (e.g., RMSI PDCCH, and OSI PDCCH). That is, a PDCCH may configure one of the RMSI or the OSI within the initial active DL BWP. In some cases, however, the scheduling regions for RMSI and OSI may overlap in time. In such cases, the UE 115 may attempt searching for both RMSI and OSI within the overlapping scheduling region, and may be unable to distinguish them from each other. As described herein, the search space for RMSI PDCCH may be configured by the PBCH, while the search space for OSI PDCCH may be configured via the RMSI. In some cases, the search spaces for RMSI and OSI PDCCH may be common search spaces. Additionally or alternatively, RMSI and OSI ambiguity may arise, in part due to different PDSCH DMRS sequences (i.e., reference point selection for DMRS sequence mapping), which may impact PDSCH decoding.

In some cases, the base station 105 may modify DCI composition by adding a bit field to the scheduling DCI, thus enabling the UE 115 to distinguish the RMSI from the OSI. In some other cases, an existing bit field (e.g., MCS indication field) in the scheduling DCI may be reused (or reconfigured), enabling the UE 115 to identify whether the DCI pertains to the RMSI or the OSI. In some other cases, the base station may utilize different SI-RNTIs for RMSI and OSI. In some examples, the UE 115 may perform blind detection with two or more PDSCH DMRS sequence hypotheses. Additionally or alternatively, the base station 105 may use different DMRS sequence initialization values for RMSI and OSI. In some cases, different DMRS ports and/or DMRS tone locations may be used for RMSI and OSI. In some cases, RMSI and OSI may be distinguished by changes to the RMSI and OSI resource grids, including selection of reference points. In some examples, reference point modification for DMRS sequence mapping for RMSI and OSI may be supported. In some cases, interleaved mapping may be enabled or disabled. Thus, in some cases, the described techniques may serve to optimize and/or simplify the receiver design at the UE 115 by resolving the ambiguity between the broadcasted system information.

The subject matter described in this disclosure can be implemented to realize one or more potential advantages. For example, when RMSI and OSI are scheduled in the same or different regions of a downlink bandwidth part, a UE may have difficulty differentiating between different types of broadcasted system information. Thus, a UE may be unable to successfully monitor and receive important changes in system information. If a UE is not able to receive certain system information, the UE may not be correctly configured to receive and process data, such as user data. If a UE is not correctly receiving and processing data, the communication system 100 may be impacted because various data may not be transmitted between various devices. Further, a chipset (e.g., modem, processor) of a UE, if not configured correctly based on the system data, may waste processing resources processing data using the wrong configuration. Aspects of the disclosure described herein allow a UE to efficiently identify RMSI or OSI based on a received message including DCI. As described herein, the UE may use various techniques for identifying the scheduled system information based on the DCI. Using the identified system information, the UE may be correctly configured to receive and process relevant information, which may reduce UE and communications system 100 inefficiencies. Further, the chipset of the UE may not waste processing resources on processing incorrect or irrelevant information, which may impact performance of the chipset as well as the UE (e.g., improve battery life).

Figure 2:
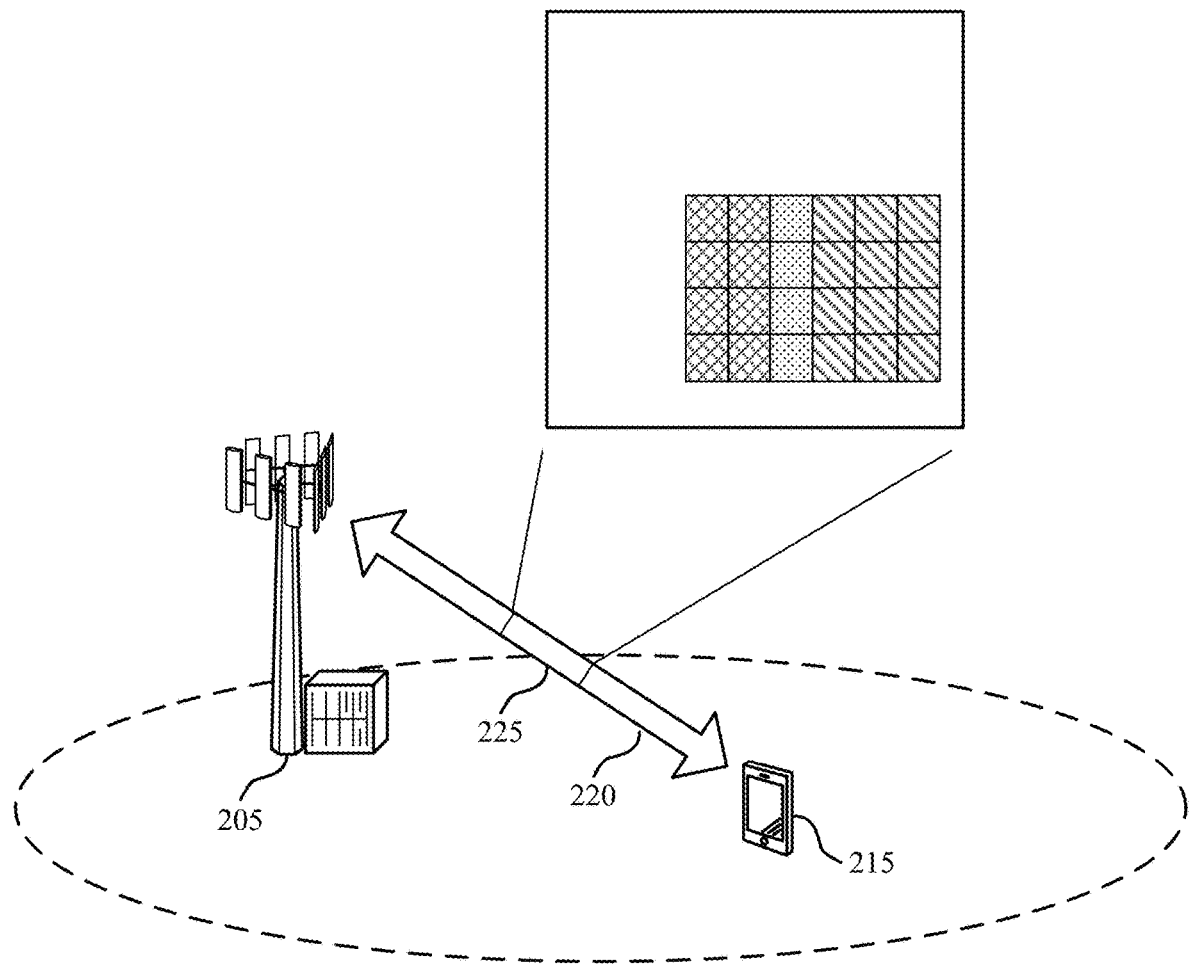

FIG. 2 illustrates an example of a wireless communications system 200 that supports resource mapping for broadcasted system information in accordance with aspects of the present disclosure. In some examples, wireless communications system 200 may implement aspects of wireless communication system 100. The wireless communications system 200 may include UE 215 and base station 205, which may be examples of the UE 115 and base station 105 described with reference to FIG. 1. As shown, UE 215 may communicate with base station 205 via communication links 220. The wireless communications system 200 may also operate according to a radio access technology (RAT) such as a fifth generation (5G) new radio (NR) RAT, although techniques described herein may be applied to any RAT.

In some cases, the base station 205 may configure a CORESET, such as CORESET0, associated with search spaces for transmission of control information (e.g., DCI) indicating the scheduled and allocated resources in a downlink transmission to the UE 215. For example, the base station 205 may transmit DCI on a downlink control channel, such as a PDCCH. In some examples, the base station 205 may transmit UE specific scheduling assignments for downlink resource allocation, uplink grants, physical random access channel (PRACH) responses, uplink power control commands, and common scheduling assignments for signaling messages on the PDCCH. In some cases, the PDCCH may also be used to schedule RMSI and/or OSI broadcasted from the base station 205. The base station 205 may transmit the control information during one or more symbols within a given TTI (e.g., a slot, a mini-slot, an sTTI).

In some cases, CORESET0 may be configured via a MIB transmitted using a PBCH. Further, in some cases, the DCI obtained within CORESET0 and a search space may be used to indicate the resources (i.e., scheduling regions) on which certain types of system information may be received over a downlink shared channel. For instance, in some cases, RMSI and OSI may arrive over a downlink shared channel, such as PDSCH. Furthermore, the PDSCH may be scheduled within an initial active DL BWP 225. In some cases, a bandwidth part may comprise a contiguous set of physical resource blocks (RBs), selected from a contiguous subset of common resource blocks on a given carrier. In some cases, RMSI and/or OSI may be scheduled in the same or different regions (i.e., within the initial active DL BWP 225), and by the same, or different PDCCH. For instance, RMSI scheduling region 230 and OSI scheduling region 240 may overlap in time, as illustrated by overlapping scheduling region 235 in FIG. 2. In such cases, the UE 215 may not be able to decode the RMSI and/or the OSI.

In some other cases, the scheduling regions for RMSI and OSI may be separately configured (i.e., no overlap in time). Further, the RMSI and OSI may be carried over different PDSCHs, which may be referred to as RMSI PDSCH and OSI PDSCH. In some examples, the RMSI may deliver an offset, which may be used to acquire an absolute reference point (e.g., a subcarrier 0 of a common RB0). Furthermore, the acquired absolute reference point may be used as a reference point for other PDSCH transmissions, such as OSI PDSCH, or UE specific PDSCH.

In some cases, the RMSI may include a DMRS, which may be used for PDSCH decoding. Further, the DMRS may include a DMRS sequence, which may be mapped in frequency domain. In some cases, to assist in decoding the PDSCH, a reference point may be defined in order to map DMRS sequences. In some cases, RMSI and OSI may utilize different reference points for mapping their respective DMRS sequences. For example, a DMRS sequence 0 for RMSI may be mapped to subcarrier 0 of CRB in CORESET0, while a DMRS sequence 0 for OSI may be mapped to the absolute reference point. In such cases, PDSCH decoding may be impacted due to different reference point selection for RMSI and OSI DMRS sequence mapping. As previously described, in some cases, ambiguity may also arise due to RMSI and OSI utilizing different resource grids for interleaved resource mapping. In such cases, the reference points chosen for their respective resource grids may also be different.

In some cases, the base station 205 may add a bit field in the scheduling DCI such that the RMSI and OSI may be distinguished by the value of the added bit field. In some other cases, an existing bit field (e.g., MCS indication field) in the scheduling DCI may be reused (or reconfigured), enabling the UE 215 to identify whether the DCI pertains to the RMSI or the OSI. For instance, a MSB in the MCS indication field may be used to distinguish between the RMSI and the OSI. In some other cases, the base station 205 may utilize different SI-RNTIs for RMSI and OSI. In some cases, the UE 215 may perform blind detection with two or more PDSCH DMRS sequence hypotheses, for example, based on signaling received from the base station 205. In some aspects, and as described herein, RMSI and OSI may be associated with different reference points for PDSCH DMRS sequence mapping. In some other cases, reference points for sequence mapping may coincide for RMSI and OSI, which may be referred to as the corner case. In such cases, the DMRS sequence may be the same for RMSI and OSI, and blind detection may not be used. In some examples, the base station 205 may use different DMRS sequence initialization values for RMSI and OSI.

In some examples, different DMRS ports and/or DMRS tone locations may be used for RMSI and OSI. In such cases, blind decoding may be deployed to acquire the DMRS sequence and location. For instance, the UE 215 may test different decoding hypotheses based on different ports being used for transmission of RMSI and OSI. In some cases, RMSI and OSI may use the same resource grid for defining interleaving resource bundles. For instance, the lowest numbered RB in the initial active BWP may be selected as the reference point for the RMSI and OSI PRB resource grids. In such cases, partial bundling may not be supported. It should be noted that the reference points for DMRS sequence mapping for RMSI and OSI may still be different.

In some other cases, partial bundling may be supported, and RMSI and OSI may use different resource grids for defining interleaving resource bundles. In some aspects, the lowest numbered RB in the initial active BWP may be selected as the reference point for RB bundling for RMSI. Further, the absolute reference point (i.e., common RB 0) may be selected as the reference point for RB bundling for OSI. In such cases, the base station 205 may disable interleaved mapping.

Figure 3:
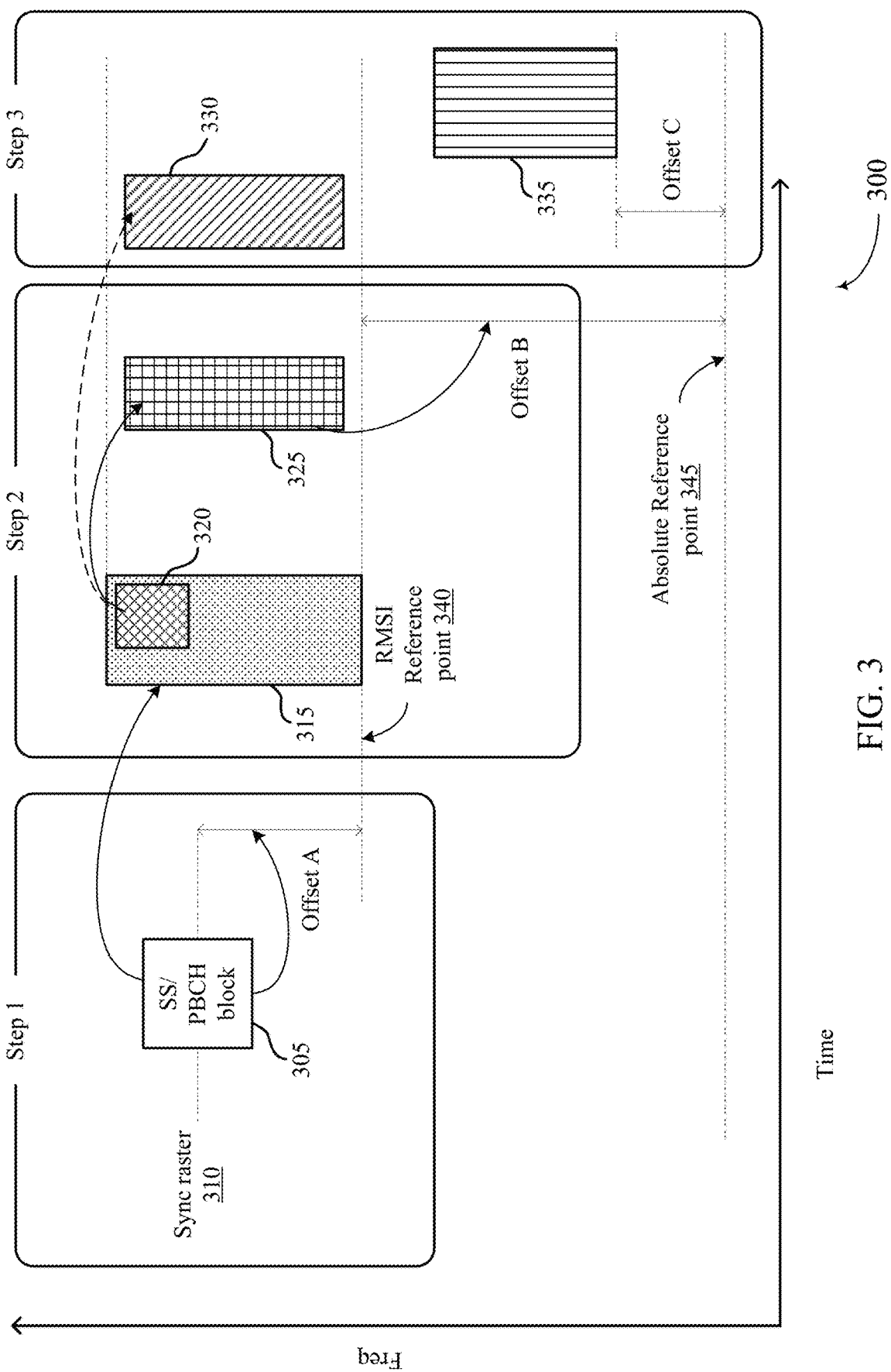
FIG. 3 illustrates an example of a reference point acquisition procedure that supports resource mapping for broadcasted system information in accordance with aspects of the present disclosure.

FIG. 3 illustrates an example of a reference point acquisition procedure 300 for communications between a base station 105 and a UE 115, in accordance with aspects of the present disclosure. In some examples, reference point acquisition procedure 300 may implement aspects of wireless communication systems 100 and/or 200, and the base station 105 and the UE 115 may be examples of a base station 205 and UE 215 as described with reference to FIG. 2.

As shown, in step 1, the base station 105 may transmit one or more synchronization signals (e.g., Primary Synchronization Signal (PSS) and Secondary Synchronization Signal (SSS)) and PBCH in a cell-defining SS/PBCH block 305. In some cases, a synchronization raster 310 may be used to indicate the position of a center subcarrier of the cell-defining SS/PBCH block 305. In some examples, the cell-defining SS/PBCH block 305 may be used to configure the CORESET0.315. As described herein, a CORESET (e.g., a CORESET0.315 or a CORESET 335) may comprise one or more resource blocks in frequency domain, and one or more OFDM symbols in time domain. In some cases, the frequency domain resources spanned by the CORESET0 may be within a BWP assigned to the UE 115. In some cases, the offset between the synchronization raster 310 and RMSI reference point 340 (i.e., subcarrier 0 of the lowest common RB (CRB) in CORESET0.315) may be referred to as Offset A. In some cases, CORESET 315 may be a RRC configured CORESET.

In some cases, a downlink control channel (e.g., PDCCH 320) may be located (or arrive) within CORESET0.315. Further, DCI carried over PDCCH 320 may be used to schedule downlink shared channel transmissions, such as RMSI PDSCH 325 and/or OSI PDSCH 330. In some cases, the RMSI PDSCH 325 may be located within the initial active DL BWP, and the RMSI may be used to indicate a search space for OSI PDCCH. As previously described, the search space for RMSI PDCCH may be configured through PBCH (i.e., cell-defining SS/PBCH block 305). In some cases, the RMSI may indicate an offset B between RMSI reference point 340 and a subcarrier 0 of common RB. In some cases, the UE 115 may use this offset B to acquire absolute reference point 345. In some cases, the absolute reference point 345 may be used as a reference point for locating PDSCH transmissions, such as OSI PDSCH 330.

In some cases, the RMSI may include a DMRS, where the DMRS may comprise a sequence mapped using the acquired reference points, in frequency domain. In some cases, DMRS sequence 0 for RMSI may be mapped to the RMSI reference point 340 (i.e., subcarrier 0 of CRB in CORESET0), while DMRS sequence 0 for OSI may be mapped to the absolute reference point 345.

Further, in some cases, the PDCCH search spaces for RMSI and OSI may be located within CORESET0, and may overlap in time. As previously described, the RMSI and OSI may be carried in PDSCH signals on resources identified by the DCI. In such cases, the UE 115 may perform blind detection to determine whether the system information is RMSI or OSI using two or more PDSCH DMRS sequence hypotheses, and based on no corner case (i.e., reference points are not coinciding). In some cases, the UE 115 may perform the blind detection based on signaling received from the base station 105. In some aspects, the UE 115 may determine whether the scheduled system information is RMSI or OSI by blindly testing different decoding hypotheses based on different DMRS sequences associated for transmissions of RMSI and OSI. Further, in some cases, the base station 105 may utilize different DMRS sequence initialization values for the different DMRS sequences associated with RMSI and OSI, which may further assist the UE 115 to detect distinctions between the RMSI and the OSI. In some cases, the blind decoding procedures discussed above may be based in part on a system information change message received at the UE 115 (i.e., UE 115 has previously acquired system information and/or reference points). For instance, the UE 115 may be attempting to decode RMSI and/or OSI for a second time, based on the system information change message received from the base station 115. In some examples, different DMRS ports and/or DMRS tone locations may be used for receiving RMSI and OSI. In such cases, blind decoding may be deployed to acquire the DMRS sequence and location, for example, by testing different decoding hypotheses based on different ports being used for transmission of RMSI and OSI.

Figure 4A:
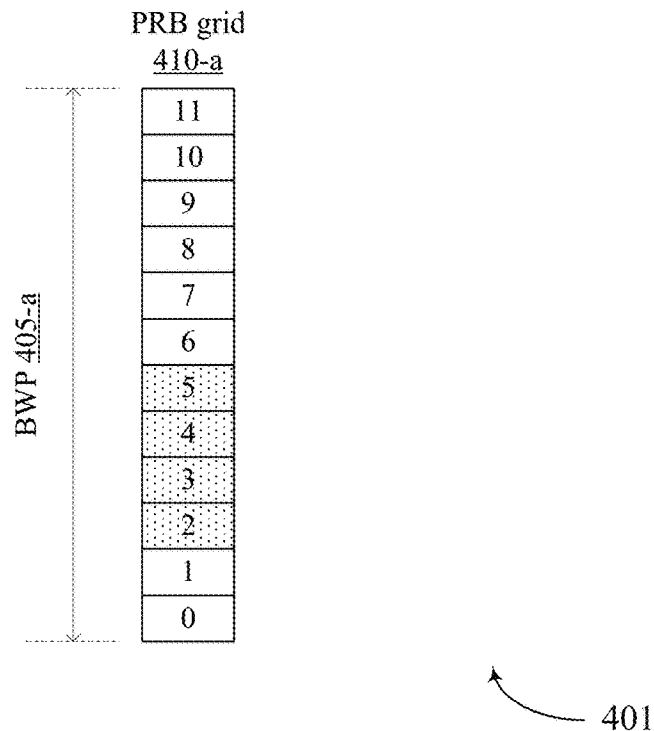
FIGS. 4A and 4B illustrate examples of resources mapping schemes for broadcasted system information in accordance with aspects of the present disclosure.
Figure 4B:
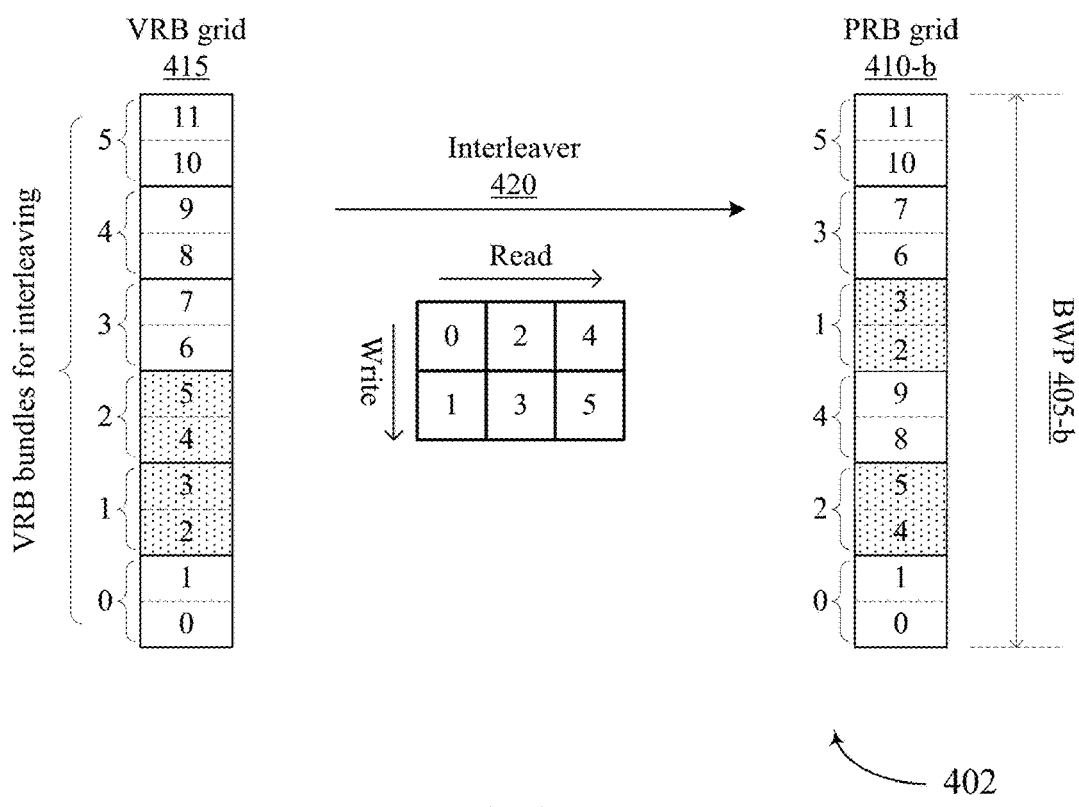

FIGS. 4A and 4B illustrates illustrate examples of resource mapping scheme 401 and resource mapping scheme 402 for broadcasted system information, in accordance with aspects of the present disclosure. In some examples, resource mapping schemes 401 and 402 may implement aspects of wireless communication systems 100 and/or 200, as described with reference to FIGS. 1 and 2. Resource mapping schemes 401 and 402 are illustrated as applied to resource blocks (RBs) of a CORESET associated with one or more search spaces. In some cases, a search space may be monitored by a UE 115 to obtain control information, including DCI.

In the illustrated examples of resource mapping schemes 401 and 402, each PRB grid 410 may comprise twelve (12) RBs, and may span the initial active BWP 405 (e.g., BWP 405-a, and BWP 405-b) in frequency domain.

In some cases, resource mapping scheme 401 may be an example of a non-interleaved mapping scheme for RB allocation. In some cases, one or more parameters, such as starting RB, and length may be selected by a base station 105 for RB allocation. In the example illustrated, starting RB=2, and length of allocation=4 RBs. In such cases, 4 contiguous RBs (i.e., first RB has RB index 2) may be selected from within the PRB grid 410-a for RB allocation.

As illustrated in FIG. 4B, resource mapping scheme 402 may be an example of an interleaved mapping scheme for RB allocation, and may use the same RB allocation parameters as resource mapping scheme 401. In some cases, a virtual RB (VRB) grid 415 may comprise 12 contiguous RBs bundled into groups of 2, forming 6 VRB bundles for interleaving. As illustrated, the four (4) RBs for RB allocation may span VRB bundles one (1) and two (2). In some cases, an interleaver 420 may be used for mapping the consecutively allocated VRBs to PRBs, as seen in PRB grid 410-b. In some examples, the interleaver 420 may write data into a matrix by columns, permute the rows and/or columns, and read out the data by rows. Thus, the interleaver 420 may be used to map and generate PRB grid 410-b, as shown. It should be noted that PRB grid 410-b is of the same size as VRB grid 415, and comprises twelve (12) RBs spanning BWP 405-b in frequency domain.

Figure 5:
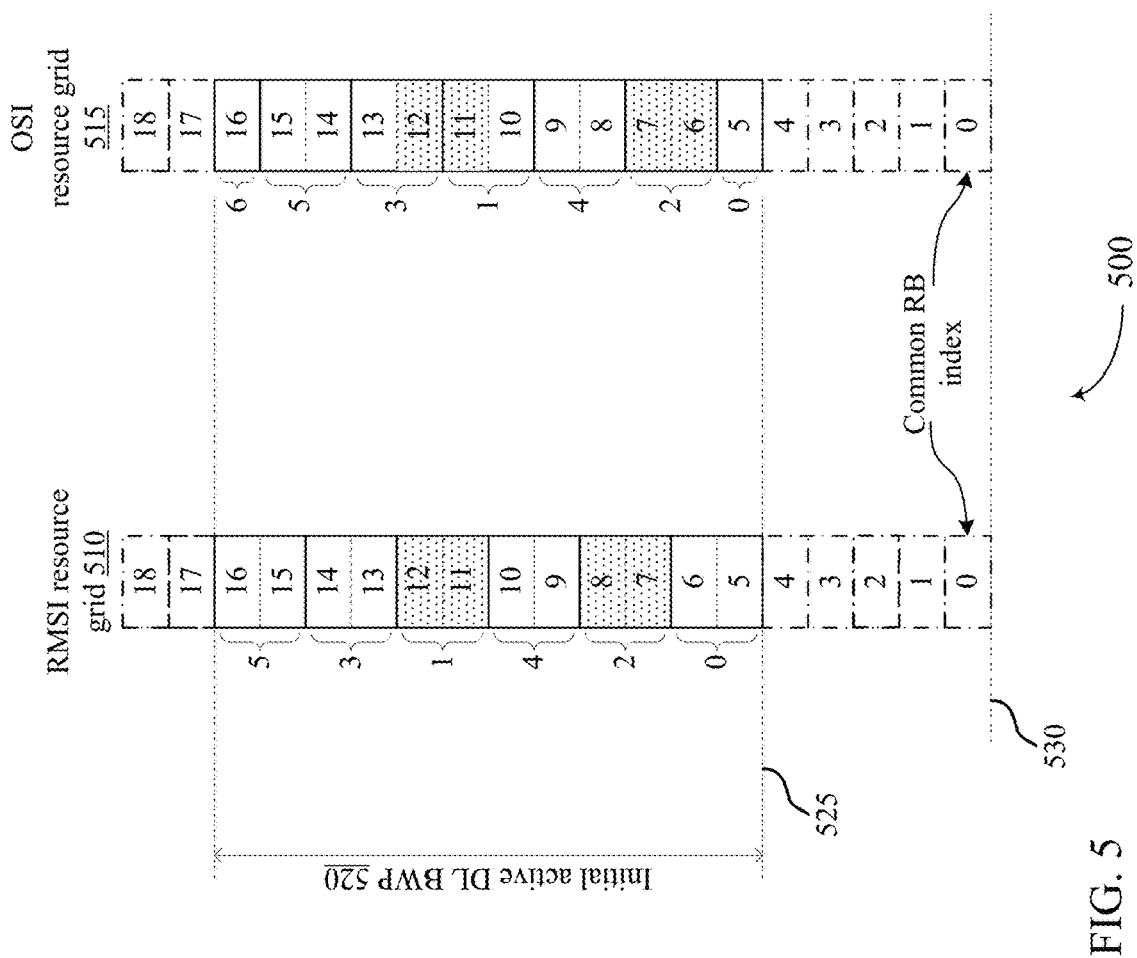
FIG. 5 illustrates an example of a resource mapping scheme that supports resource mapping for broadcasted system information in accordance with aspects of the present disclosure.
Figure 5:
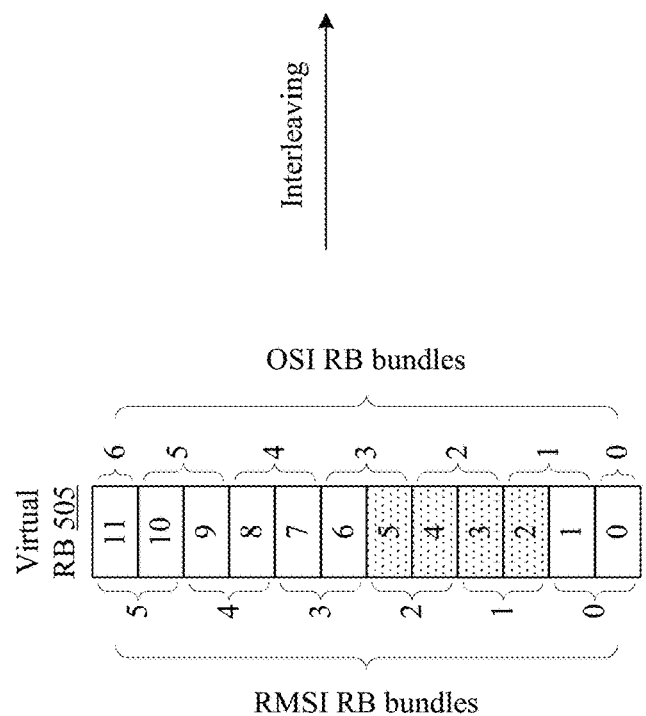

FIG. 5 illustrates an example of a resource mapping scheme 500 for broadcasted system information, in accordance with aspects of the present disclosure. In some examples, resource mapping scheme 500 may implement aspects of wireless communication systems 100 and/or 200, and resource mapping scheme 402, as described with reference to FIGS. 1, 2, and 4. In some cases, resource mapping scheme 500 is illustrated as applied to RBs of a CORESET associated with one or more search spaces. In some cases, a search space may be monitored by a UE 115 to obtain control information, such as DCI.

In some cases, resource mapping scheme 500 may be an example of an interleaved mapping scheme for RB allocation, with starting RB=2, and length of allocation=4. In some cases, a VRB grid 505 may comprise 12 contiguous RBs bundled into RMSI RB bundles and OSI RB bundles. In some cases, and as illustrated, partial bundling may be supported for OSI RB bundles. For instance, a single RB may be used to form an OSI RB bundle (e.g., OSI RB bundle 0, or OSI RB bundle 6).

Further, as illustrated, each RMSI RB bundle may comprise 2 RBs. Thus, 6 RMSI RB bundles and 7 OSI RB bundles may be formed within VRB grid 505, prior to interleaving. In some cases, an interleaver may be used to map consecutively allocated VRBs to PRBs, for example, by writing data into a matrix by columns, permuting the rows and/or columns, and reading out the data by rows.

In some cases, RMSI and OSI may use different resource grids for interleaved resource mapping. In some other cases, partial bundling may lead to different PRB grids (i.e., RMSI resource grid 510 and OSI resource grid 515) for interleaved resource mapping for RMSI and OSI. In some examples, reference points may be defined differently for the RMSI resource grid 510 and the OSI resource grid 515. For instance, the lowest numbered RB in the initial active BWP may be selected as the reference point 525 for RB bundling for RMSI. Further, the absolute reference point 530 (i.e., common RB index 0) may be selected as the reference point for RB bundling for OSI.

As previously described, in some cases, RMSI and OSI ambiguity may be based in part on different reference point selection (i.e., for resource grids) and/or resource grids. In some cases, RMSI and OSI may use the same resource grid for defining interleaving resource bundles (not shown). In such cases, partial bundling in OSI may not be supported. Additionally or alternatively, the lowest numbered RB in the initial active BWP may be selected as the common reference point for the RMSI and OSI PRB resource grids. In such cases, the base station may first identify a reference point for RB bundling for the system information, for instance, based on the type of system information. In some cases, if the base station determines that the system information is OSI, the base station may force the reference point for OSI RB bundling to be the same as that used for RMSI bundling. Upon determining that the RMSI and OSI are using the same reference point for RB bundling, the base station may decide to use an interleaved mapping for transmission of the system information. It should be noted that the reference points for DMRS sequence mapping for RMSI and OSI may remain unchanged (i.e., different reference points for the two).

In some other cases, partial bundling may be supported, and RMSI and OSI may use different resource grids for defining interleaving resource bundles. In such cases, the base station 105 may disable interleaved mapping, and may transmit an indication conveying the same.

In some cases, the base station 105 may signal the use of interleaved mapping via a VRB-to-PRB indicator in the DCI, which may be toggled between ON/OFF. In some cases, if the same interleaving grid is used for RMSI and OSI, interleaved mapping may be supported (i.e., ON/OFF), regardless of the type of system information, or if RMSI and OSI are distinguished by the DCI. In some other cases, if different interleaving grids are used for RMSI and OSI, system information may be transmitted via non-interleaved mapping.

Figure 6:
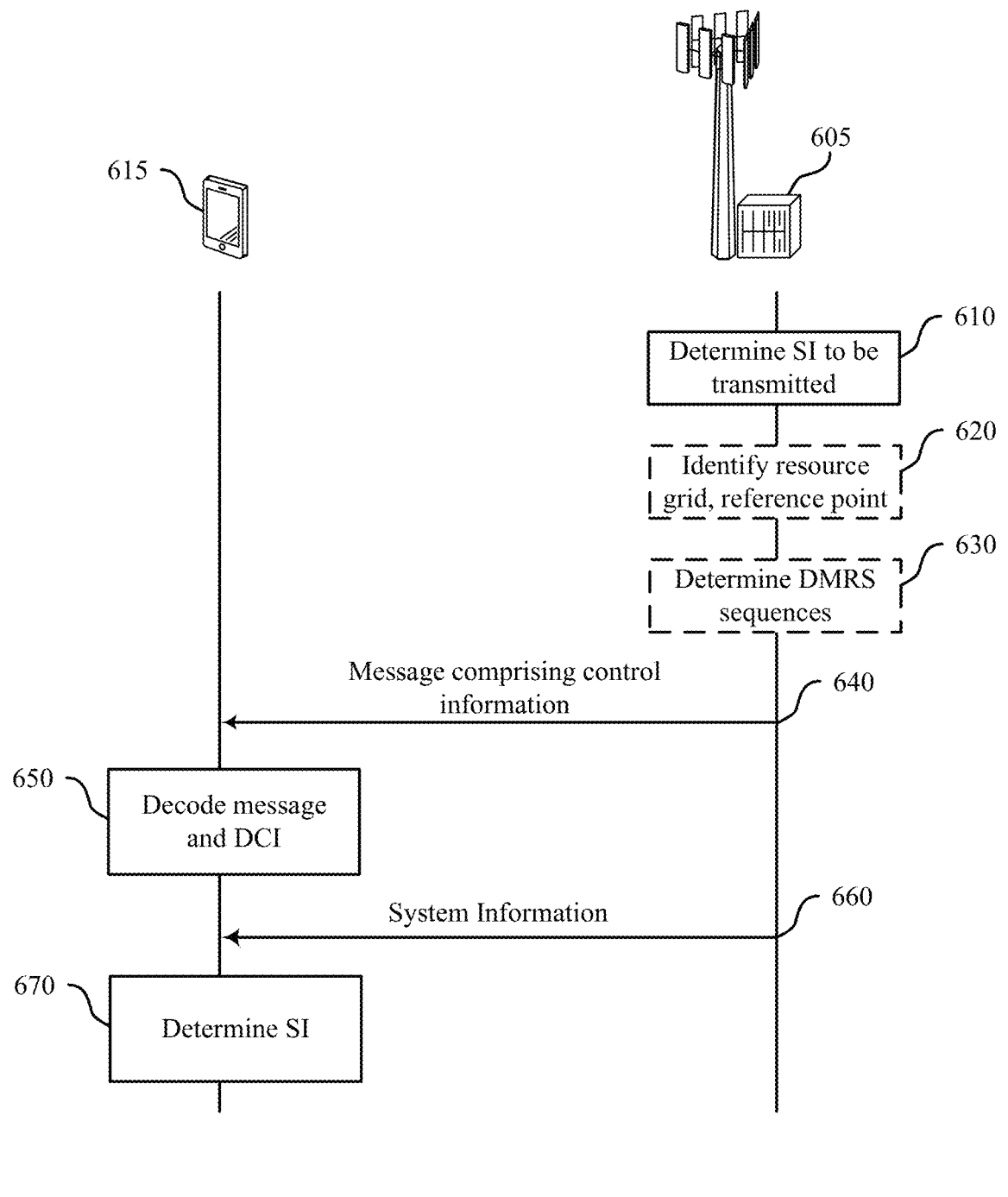
FIG. 6 illustrates an example of a process flow that supports resource mapping for broadcasted system information in accordance with aspects of the present disclosure.

FIG. 6 illustrates an example of a process flow 600 that supports resource mapping for broadcasted system information in accordance with aspects of the present disclosure. The process flow 600 may implement aspects of wireless communications systems 100 and/or 200, described with reference to FIGS. 1 and 2, and may be implemented by a UE 615, and a base station 605. In some examples, the process illustrated by flow diagram 600 may be implemented in a wireless system operating according to 5G NR RAT, although techniques described herein may be applied to any RAT.

At 610, base station 605 may determine system information (e.g., RMSI, or OSI) that is scheduled to be transmitted to UE 615.

At 640, the base station 605 may transmit a message that includes DCI pertaining to the system information. Furthermore, the base station 605 may indicate, via the message, whether the scheduled SI is RMSI or OSI. For instance, the base station may indicate via a bit field in the DCI that the DCI pertains to one of RMSI or OSI. In some other cases, an existing bit field in the scheduling DCI may be reused (or reconfigured), enabling the UE 615 to identify whether the DCI pertains to the RMSI or the OSI. In some other cases, the base station may scramble the message (prior to transmission) using a SI-RNTI that is unique based on whether the system information is RMSI or OSI.

In some cases, at 620, the base station 605 may determine if the system information is to be mapped to a same resource grid, regardless of whether the system information is RMSI or OSI, or, if the RMSI and OSI use different resource grids. Furthermore, the base station 605 may identify a reference point for RB bundling for the system information. In some cases, the base station 605 may identify that the reference point is a common RB 0 when the system information is OSI, and that the reference point is a lowest numbered RB in an initial active BWP when the system information is RMSI. In some other cases, the base station 605 may identify that the reference point is the lowest numbered RB in the initial active BWP, regardless of the type of system information. Upon determination of the reference point(s) for RB bundling, and the resource grid mapping to be used for the system information, the base station 605 may determine if the system information is to be transmitted via interleaved or non-interleaved mapping. In some cases, the base station 605 may force a reference point for RB bundling for OSI to be a same reference point as that used for RB bundling for RMSI, in order to use interleaved mapping for transmission of the system information.

In some cases, at 630, the base station 605 may determine at least one of different DMRS sequences associated with the system information or different ports for transmission of the system information. For instance, the different DMRS sequences may include different sequence initialization values based on whether the system information is RMSI or OSI.

In some cases, the base station 605 may transmit the message comprising control information, including information pertaining to interleaved or non-interleaved mapping.

At 650, the UE 615 may decode the message, including the DCI. In some cases, the UE 615 may determine, based at least in part on the message, whether the scheduled system information is RMSI or OSI. For instance, the UE 615 may receive an indication (i.e., a bit field) that the DCI pertains to one of RMSI or OSI. In some other cases, the UE 615 may determine the type of system information from the SI-RNTI used to unscramble the message. In some cases, the UE 615 may also determine the type of mapping used (i.e., interleaved or non-interleaved) for the system information, and if the same RMSI and OSI use the same or different resource grids.

At 660, the UE 615 may search a downlink bandwidth part (i.e., initial active DL BWP) for the scheduled RMSI or OSI transmitted from the base station 605. In some cases, the RMSI or OSI may be carried in PDSCH signals transmitted from the base station 605.

At 670, the UE 615 may determine the system information, based in part on the information received at 640 and 650.

Figure 7:
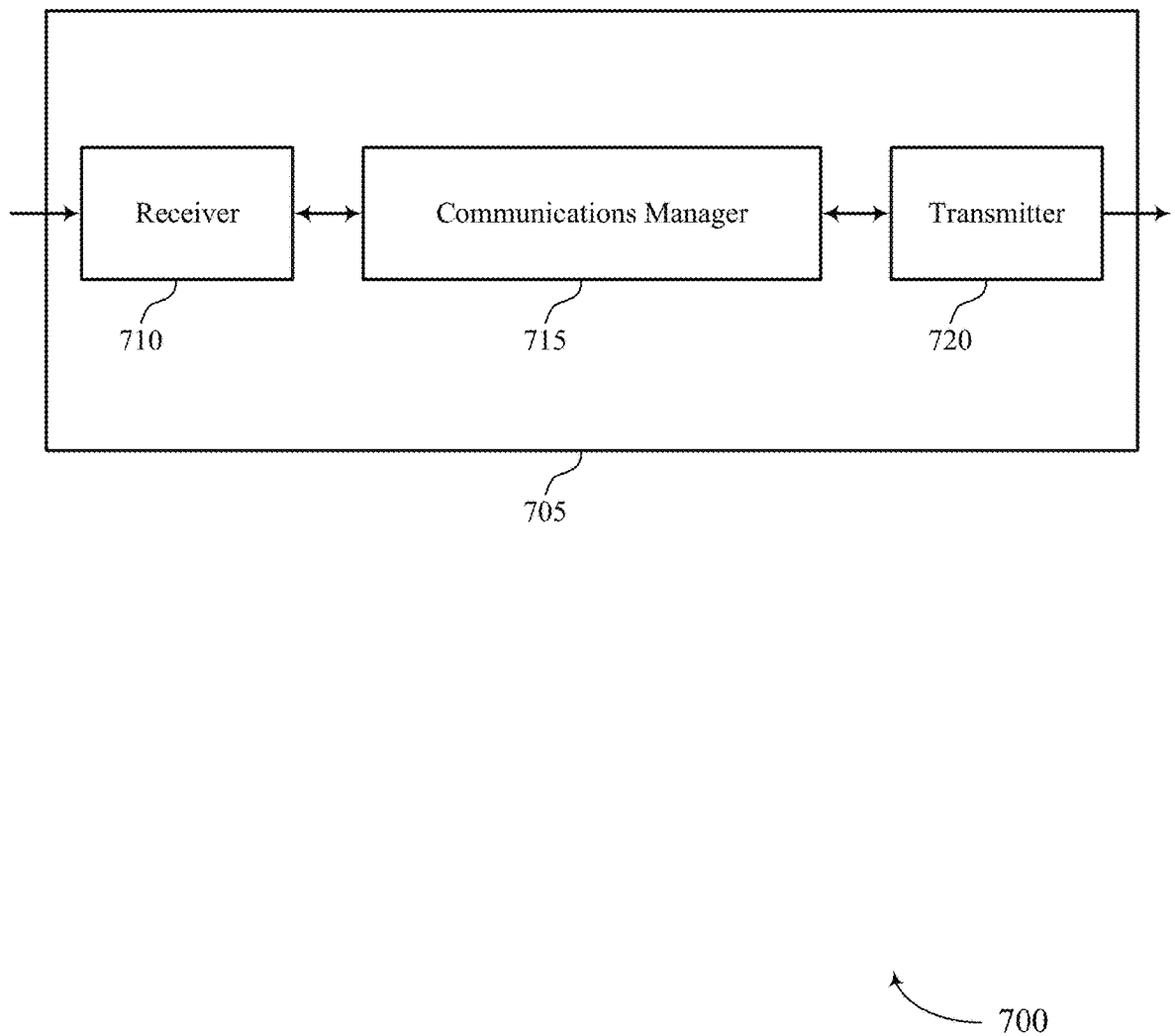
FIGS. 7 and 8 show block diagrams of devices that support resource mapping for broadcasted system information in accordance with aspects of the present disclosure.

FIG. 7 shows a block diagram 700 of a device 705 that supports resource mapping for broadcasted system information in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to resource mapping for broadcasted system information, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a message that includes DCI pertaining to system information that is scheduled to be received, determine, based on the message, that the system information that is scheduled is one of RMSI or is OSI, and search a downlink bandwidth part for the scheduled one of RMSI or OSI determined from the message. In some cases, the communications manager 715 may also receive a message that includes DCI pertaining to system information that is scheduled to be received, determine that the system information that is scheduled is one of RMSI or OSI by blindly testing one or more decoding hypotheses, and receive the one of RMSI or OSI, as scheduled by the DCI. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. Using the techniques described herein, the device implementing the respective hardware may efficiently identify system information (e.g., RMSI or OSI), such that the hardware does not waste resources (e.g., processing resources) processing irrelevant or incorrect information.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
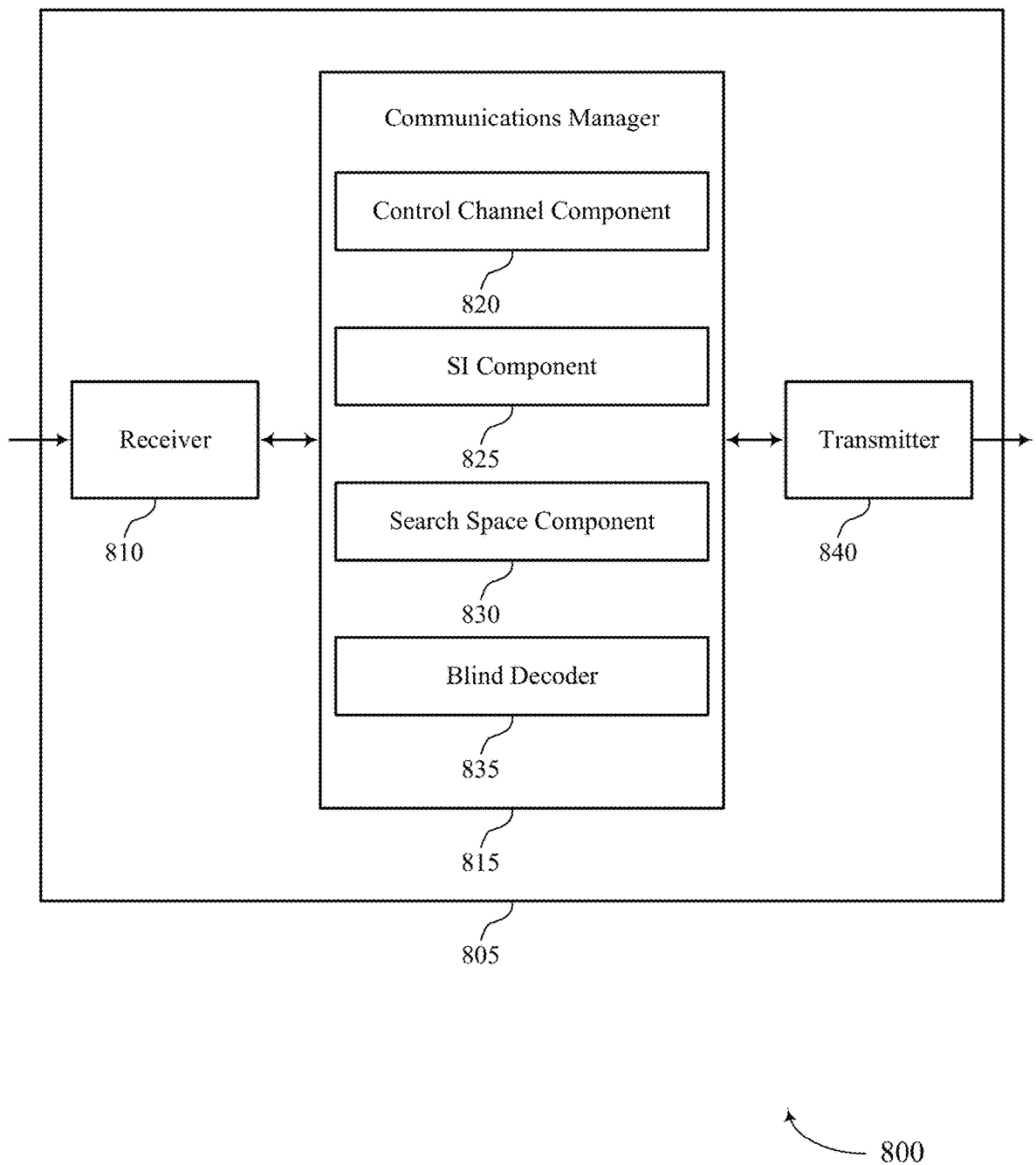

FIG. 8 shows a block diagram 800 of a device 805 that supports resource mapping for broadcasted system information in accordance with aspects of the present disclosure. The device 805 may be an example of aspects of a device 705 or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to resource mapping for broadcasted system information, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control channel component 820, a SI component 825, a search space component 830, and a blind decoder 835. The communications manager 815 may be an example of aspects of the communications manager 1010 described herein.

The control channel component 820 may receive a message that includes DCI pertaining to system information that is scheduled to be received.

The SI component 825 may determine, based on the message, that the system information that is scheduled is one of RMSI or is OSI.

The search space component 830 may search a downlink bandwidth part for the scheduled one of RMSI or OSI determined from the message.

The control channel component 820 may receive a message that includes DCI pertaining to system information that is scheduled to be received.

The blind decoder 835 may determine that the system information that is scheduled RMSI or is OSI by blindly testing one or more decoding hypotheses.

The SI component 825 may receive one of the RMSI or the OSI, as scheduled by the DCI.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
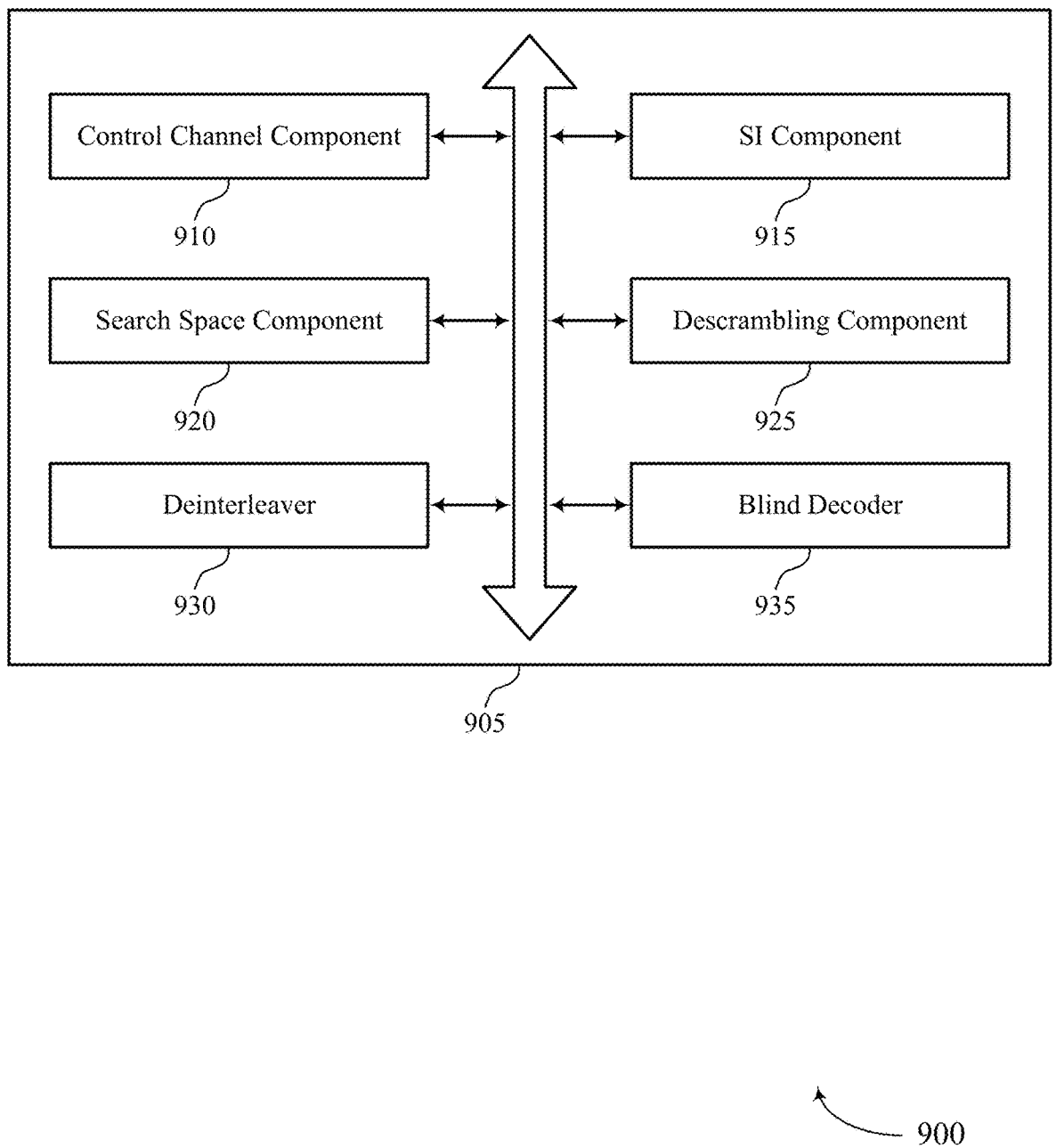
FIG. 9 shows a block diagram of a communications manager that supports resource mapping for broadcasted system information in accordance with aspects of the present disclosure.

FIG. 9 shows a block diagram 900 of a communications manager 905 that supports resource mapping for broadcasted system information in accordance with aspects of the present disclosure. The communications manager 905 may be an example of aspects of a communications manager 715, a communications manager 815, or a communications manager 1010 described herein. The communications manager 905 may include a control channel component 910, a SI component 915, a search space component 920, a descrambling component 925, a deinterleaver 930, and a blind decoder 935. Each of these modules may communicate, directly or indirectly, with one another (e.g., via one or more buses).

The control channel component 910 may receive a message that includes DCI pertaining to system information that is scheduled to be received.

In some examples, the control channel component 910 may receive a message that includes DCI pertaining to system information that is scheduled to be received.

The SI component 915 may determine, based on the message, that the system information that is scheduled is RMSI or is OSI. In some examples, the SI component 915 may receive one of the RMSI or the OSI, as scheduled by the DCI. In some examples, the SI component 915 may receive, in the DCI, an indication that the DCI pertains to one of RMSI or OSI. In some cases, the indication is a bit field, such as a MCS field, or any other bit field in the DCI that may be reconfigured, or reused. In some examples, the SI component 915 may determine from the SI-RNTI used to unscramble the message, that the DCI pertains to one of RMSI or OSI. In some examples, the SI component 915 may receive the message as part of a procedure to update already received system information. In some examples, the SI component 915 may receive the message as part of a procedure to update already received system information.

The search space component 920 may search a downlink bandwidth part for the scheduled RMSI or OSI determined from the message.

The blind decoder 935 may determine that the system information that is scheduled is one of RMSI or OSI by blindly testing one or more decoding hypotheses.

In some examples, the blind decoder 935 may test different decoding hypotheses based on different DMRS sequences associated for transmission of RMSI and for transmission of OSI. In some examples, the blind decoder 935 may test different decoding hypotheses based on different ports being used for transmission of RMSI and for transmission of OSI. In some cases, the different DMRS sequences include different sequence initialization values based on whether the system information is RMSI or OSI.

The descrambling component 925 may unscramble the message using a system information radio network temporary identifier (SI-RNTI) of a set of SI-RNTIs.

The deinterleaver 930 may receive, in the DCI, an indication that the system information is to be received via an interleaved mapping, where the system information is mapped to a same resource grid regardless of whether the system information is RMSI or OSI. In some examples, the deinterleaver 930 may receive, in the DCI, an indication that the system information is to be received without an interleaved mapping, where the system information is mapped to a different resource grid depending on whether the system information is RMSI or OSI.

In some examples, the deinterleaver 930 may receive, in the DCI, an indication that the system information is to be received via an interleaved mapping, where the system information is mapped to a same resource grid regardless of whether the system information is RMSI or OSI. In some examples, the deinterleaver 930 may receive, in the DCI, an indication that the system information is to be received without an interleaved mapping, where the system information is mapped to a different resource grid depending on whether the system information is RMSI or OSI.

Figure 10:
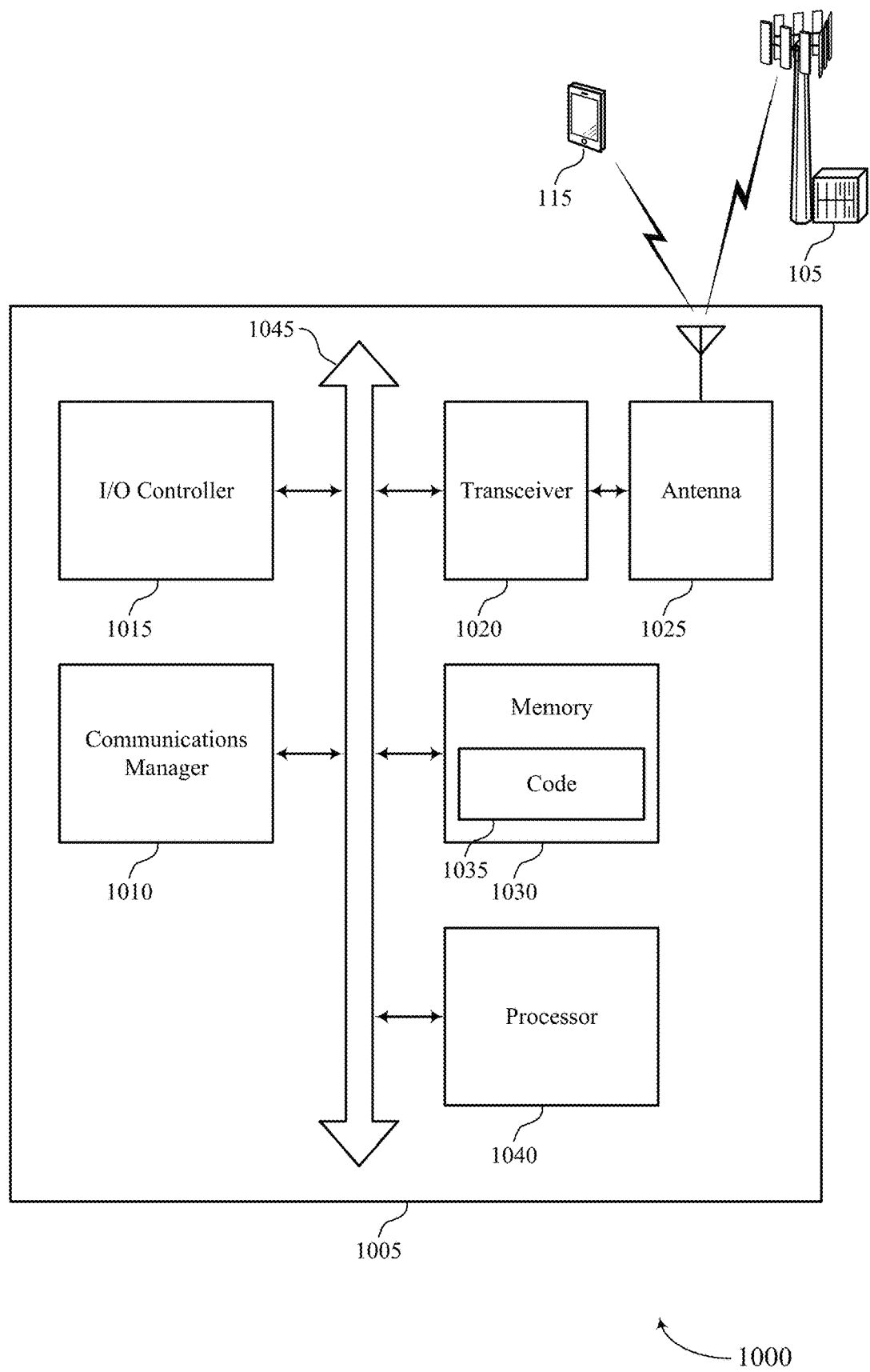
FIG. 10 shows a diagram of a system including a device that supports resource mapping for broadcasted system information in accordance with aspects of the present disclosure.

FIG. 10 shows a diagram of a system 1000 including a device 1005 that supports resource mapping for broadcasted system information in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a message that includes DCI pertaining to system information that is scheduled to be received, determine, based on the message, that the system information that is scheduled is one of RMSI or OSI, and search a downlink bandwidth part for the scheduled one of RMSI or OSI determined from the message. The communications manager 1010 may also receive a message that includes DCI pertaining to system information that is scheduled to be received, determine that the system information that is scheduled is RMSI or is OSI by blindly testing one or more decoding hypotheses, and receive one of the RMSI or the OSI, as scheduled by the DCI.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting resource mapping for broadcasted system information).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Using the techniques described herein, the device 100 may correctly identify system data (e.g., RMSI or OSI). Using the identified system information, the device 100 may be correctly configured to receive, process, and transmit data, which may reduce device 100 and communication system inefficiencies.

Figure 11:
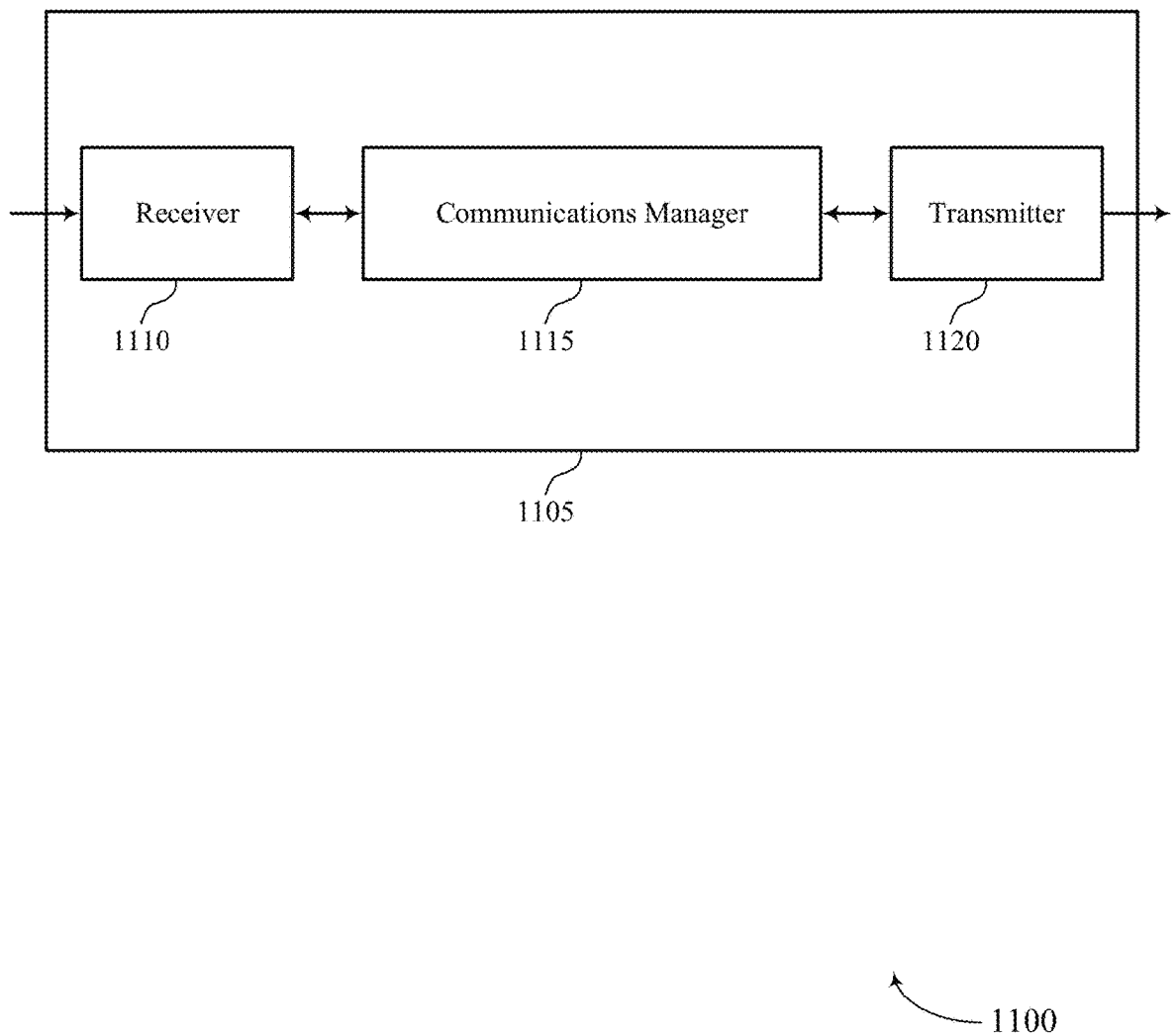
FIGS. 11 and 12 show block diagrams of devices that support resource mapping for broadcasted system information in accordance with aspects of the present disclosure.

FIG. 11 shows a block diagram 1100 of a device 1105 that supports resource mapping for broadcasted system information in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to resource mapping for broadcasted system information, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a message that includes DCI pertaining to system information that is scheduled to be transmitted, indicate, via the message, that the system information that is scheduled is one of RMSI or is OSI, and transmit one of RMSI or OSI in accordance with the message. The communications manager 1115 may also transmit a message that includes DCI pertaining to system information that is scheduled to be transmitted, indicate that the system information that is scheduled is one of RMSI or OSI by using at least one of different DMRS sequences associated with the system information or different ports for transmission of the system information, and transmit one of RMSI or OSI using the at least one of different DMRS sequences or different ports. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
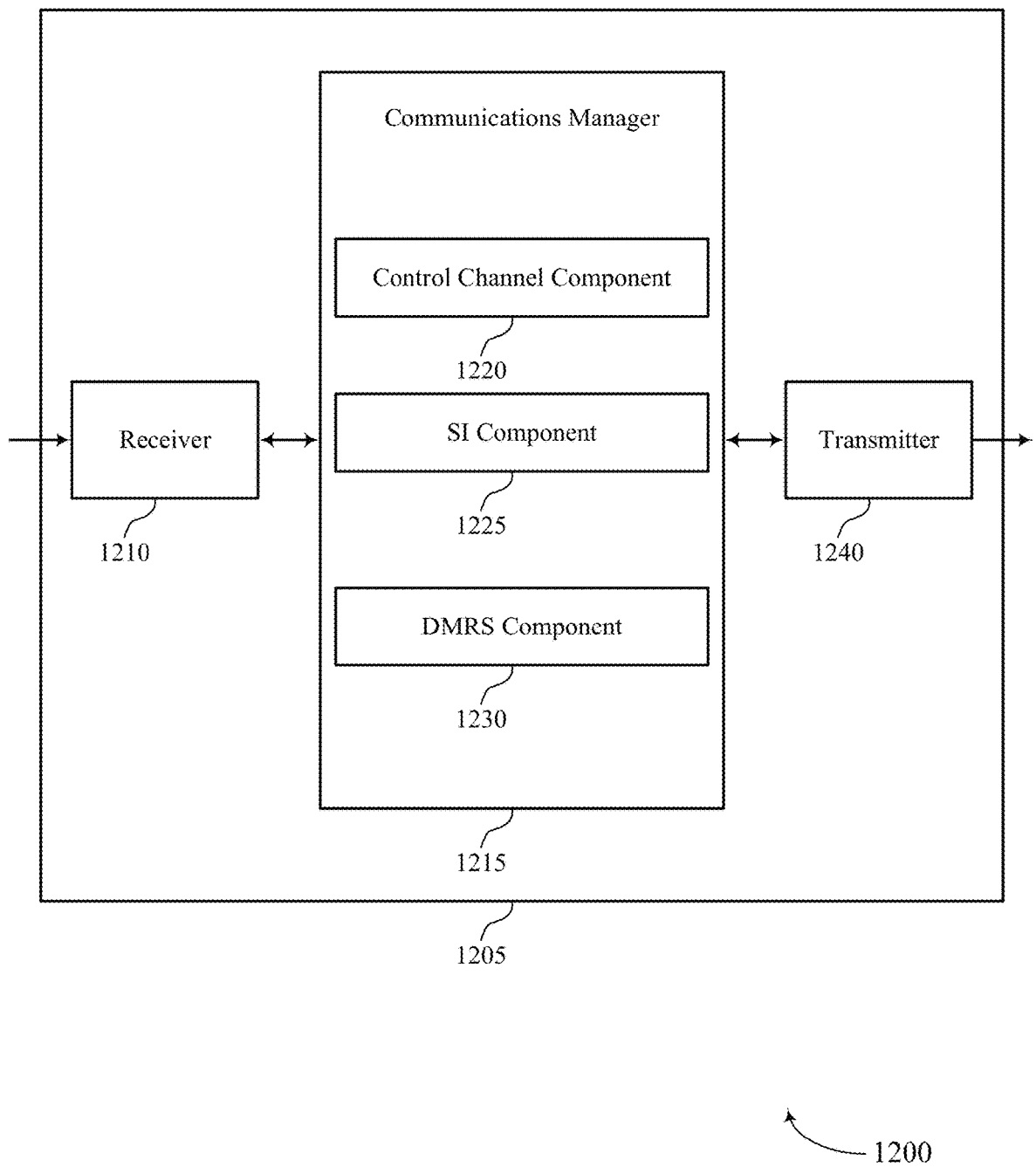

FIG. 12 shows a block diagram 1200 of a device 1205 that supports resource mapping for broadcasted system information in accordance with aspects of the present disclosure. The device 1205 may be an example of aspects of a device 1105 or a base station 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to resource mapping for broadcasted system information, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control channel component 1220, a SI component 1225, and a DMRS component 1230. The communications manager 1215 may be an example of aspects of the communications manager 1410 described herein.

The control channel component 1220 may transmit a message that includes DCI pertaining to system information that is scheduled to be transmitted.

The SI component 1225 may indicate, via the message, that the system information that is scheduled is RMSI or is OSI.

The SI component 1225 may transmit one of RMSI or OSI in accordance with the message.

The control channel component 1220 may transmit a message that includes DCI pertaining to system information that is scheduled to be transmitted.

The SI component 1225 may indicate that the system information that is scheduled is RMSI or is OSI by using at least one of different DMRS sequences associated with the system information or different ports for transmission of the system information.

The DMRS component 1230 may transmit one of RMSI or OSI using the at least one of different DMRS sequences or different ports.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
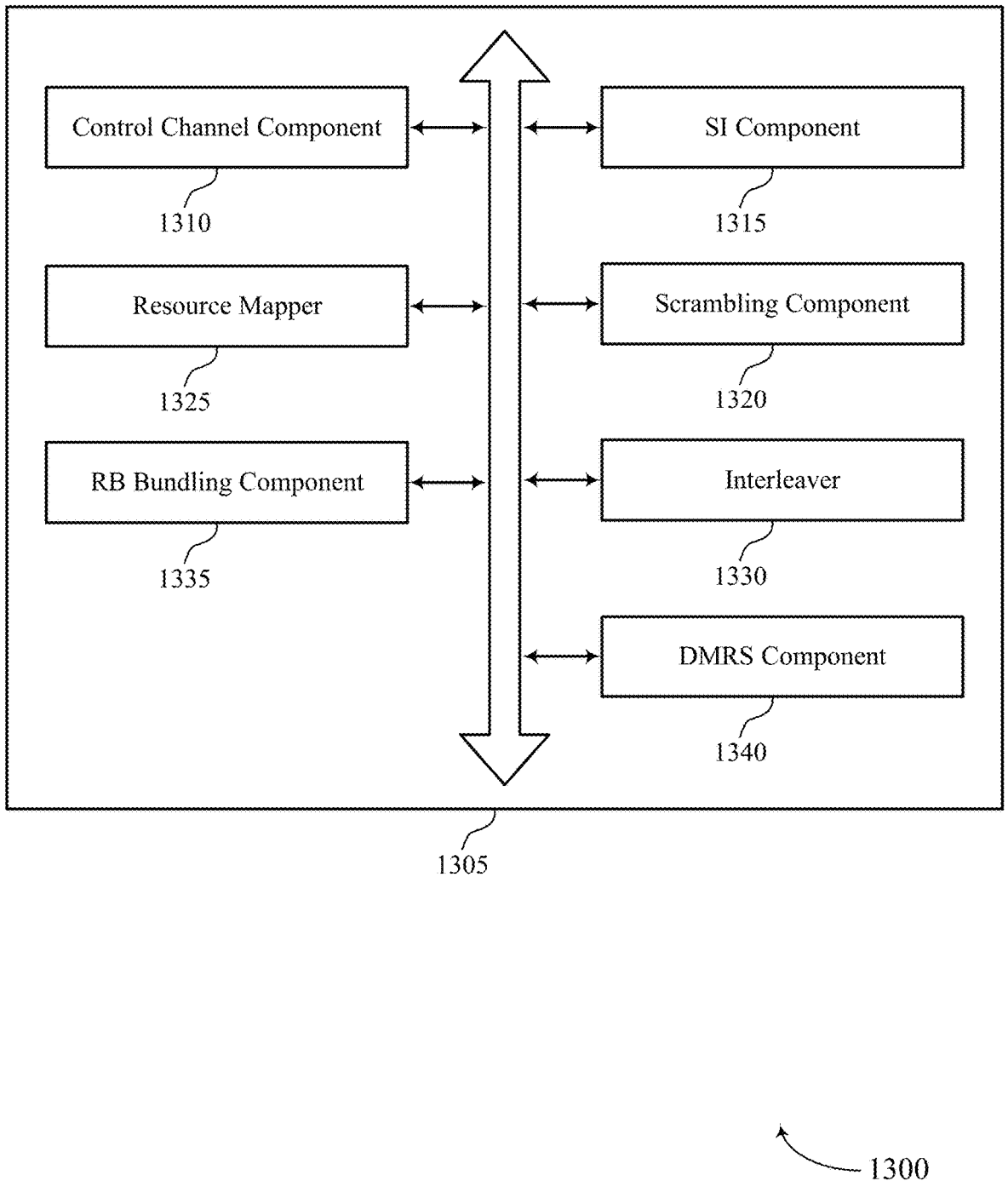
FIG. 13 shows a block diagram of a communications manager that supports resource mapping for broadcasted system information in accordance with aspects of the present disclosure.

FIG. 13 shows a block diagram 1300 of a communications manager 1305 that supports resource mapping for broadcasted system information in accordance with aspects of the present disclosure. The communications manager 1305 may be an example of aspects of a communications manager 1115, a communications manager 1215, or a communications manager 1410 described herein. The communications manager 1305 may include a control channel component 1310, a SI component 1315, a scrambling component 1320, a resource mapper 1325, an interleaver 1330, a RB bundling component 1335, and a DMRS component 1340. Each of these modules may communicate, directly or indirectly, with one another (e.g., via one or more buses).

The control channel component 1310 may transmit a message that includes DCI pertaining to system information that is scheduled to be transmitted.

In some examples, the control channel component 1310 may transmit a message that includes DCI pertaining to system information that is scheduled to be transmitted. In some examples, the control channel component 1310 may transmit, in the DCI, an indication that the system information is to be transmitted via the interleaved mapping. In some examples, the control channel component 1310 may transmit, in the DCI, an indication that the system information is to be transmitted via the non-interleaved mapping.

The SI component 1315 may indicate, via the message, that the system information that is scheduled is RMSI or is OSI. In some examples, the SI component 1315 may indicate whether the system information that is scheduled is one RMSI or OSI by using at least one of different DMRS sequences associated with the system information or different ports for transmission of the system information. In some examples, the SI component 1315 may transmit, in the DCI, an indication that the DCI pertains to one of RMSI or OSI. In some cases, the indication is a bit field, such as a MCS field, or any other bit field in the DCI that may be reconfigured, or reused. In some examples, the SI component 1315 may transmit the message as part of a procedure to update already transmitted system information. The SI component 1315 may transmit one of RMSI or OSI in accordance with the message.

The DMRS component 1340 may transmit one of RMSI or OSI using the at least one of different DMRS sequences or different ports. In some cases, the different DMRS sequences include different sequence initialization values based on whether the system information is RMSI or OSI.

The scrambling component 1320 may scramble the message using a SI-RNTI that is unique based on the system information being RMSI or OSI.

The resource mapper 1325 may determine that the system information is to be mapped to a same resource grid, regardless of whether the system information is RMSI or OSI. In some examples, the resource mapper 1325 may identify a reference point for RB bundling for the system information, where the reference point is a lowest numbered RB in an initial active bandwidth part regardless of whether the system information is RMSI or OSI. In some examples, the resource mapper 1325 may determine that the system information is to be mapped to a different resource grid depending on the system information being RMSI or OSI. In some examples, the resource mapper 1325 may force a reference point for RB bundling for OSI to be a same reference point as that used for RB bundling for RMSI.

The interleaver 1330 may determine, based on the RMSI and the OSI using the same resource grid, to use an interleaved mapping for transmission of the system information. In some examples, the interleaver 1330 may determine, based on the RMSI and the OSI using different resource grids, to use a non-interleaved mapping for transmission of the system information. In some examples, the interleaver 1330 may determine, based on the RMSI and the OSI using the same reference point for RB bundling, to use an interleaved mapping for transmission of the system information.

The RB bundling component 1335 may identify a reference point for RB bundling for the system information, where the reference point is a lowest numbered RB in an initial active bandwidth part when the system information is RMSI. In some examples, the RB bundling component 1335 may identify a reference point for RB bundling for the system information, where the reference point is a common RB 0 when the system information is OSI. In some examples, the RB bundling component 1335 may identify a reference point for RB bundling for the system information, where the reference point is a lowest numbered RB in an initial active bandwidth part when the system information is RMSI. In some examples, the RB bundling component 1335 may force a reference point for RB bundling for OSI to be a same reference point as that used for RB bundling for RMSI.

Figure 14:
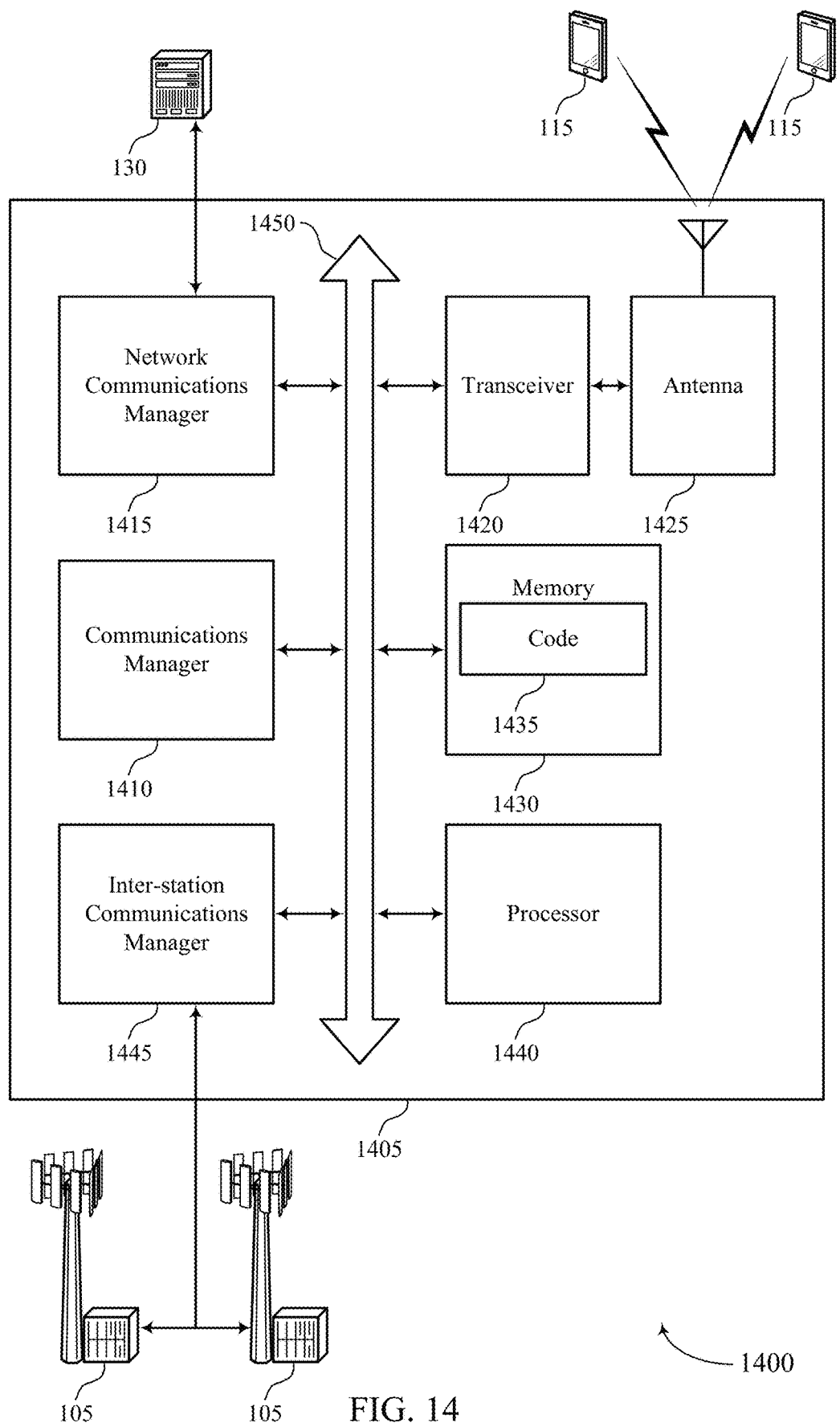
FIG. 14 shows a diagram of a system including a device that supports resource mapping for broadcasted system information in accordance with aspects of the present disclosure.

FIG. 14 shows a diagram of a system 1400 including a device 1405 that supports resource mapping for broadcasted system information in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a message that includes DCI pertaining to system information that is scheduled to be transmitted, indicate, via the message, that the system information that is scheduled is RMSI or is OSI, and transmit one of RMSI or OSI in accordance with the message. The communications manager 1410 may also transmit a message that includes DCI pertaining to system information that is scheduled to be transmitted, indicate that the system information that is scheduled is one of RMSI or OSI by using at least one of different DMRS sequences associated with the system information or different ports for transmission of the system information, and transmit the one of RMSI or OSI using the at least one of different DMRS sequences or different ports.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting resource mapping for broadcasted system information).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
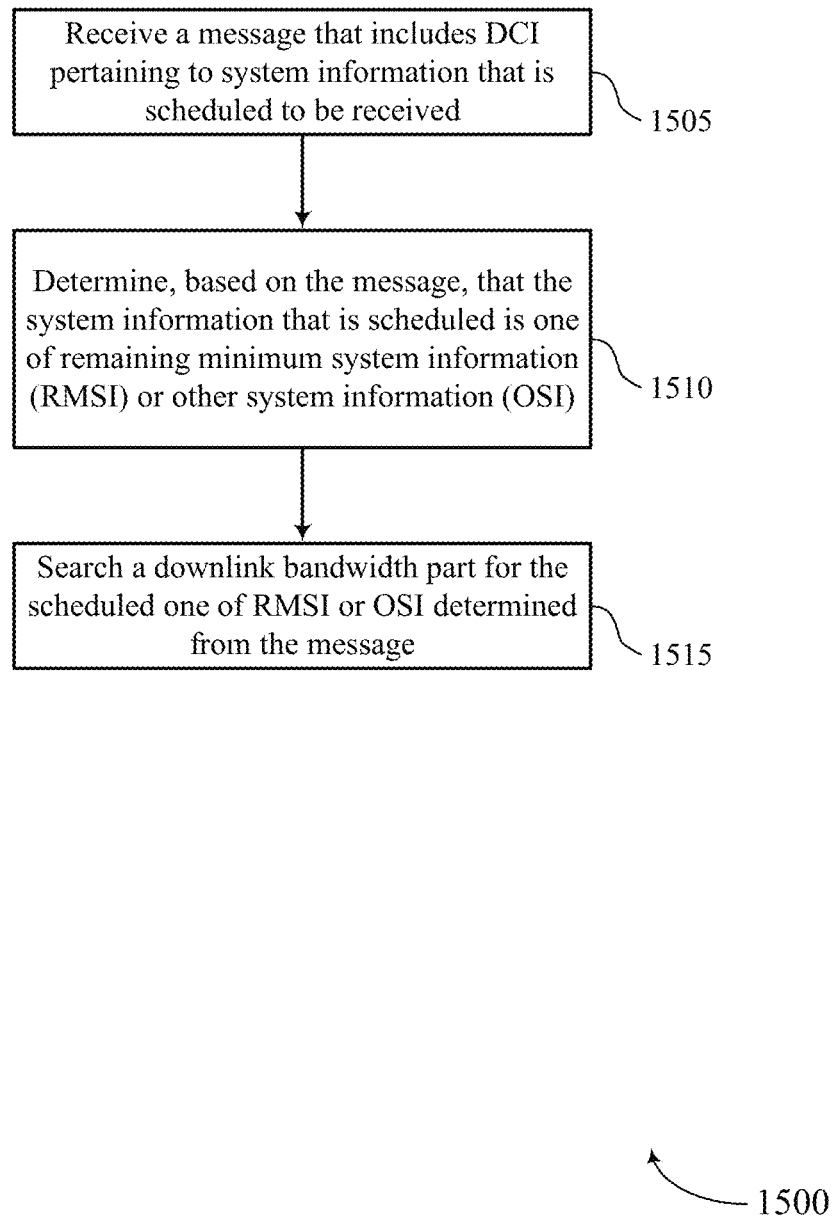
FIGS. 15 through 18 show flowcharts illustrating methods that support resource mapping for broadcasted system information in accordance with aspects of the present disclosure.

FIG. 15 shows a flowchart illustrating a method 1500 that supports resource mapping for broadcasted system information in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive a message that includes DCI pertaining to system information that is scheduled to be received. The operations of 1505 may be performed according to the methods described herein. In some examples, aspects of the operations of 1505 may be performed by a control channel component as described with reference to FIGS. 7 through 10.

At 1510, the UE may determine, based on the message, that the system information that is scheduled is one of RMSI or OSI. The operations of 1510 may be performed according to the methods described herein. In some examples, aspects of the operations of 1510 may be performed by a SI component as described with reference to FIGS. 7 through 10.

At 1515, the UE may search a downlink bandwidth part for the scheduled one of RMSI or OSI determined from the message. The operations of 1515 may be performed according to the methods described herein. In some examples, aspects of the operations of 1515 may be performed by a search space component as described with reference to FIGS. 7 through 10.

Figure 16:
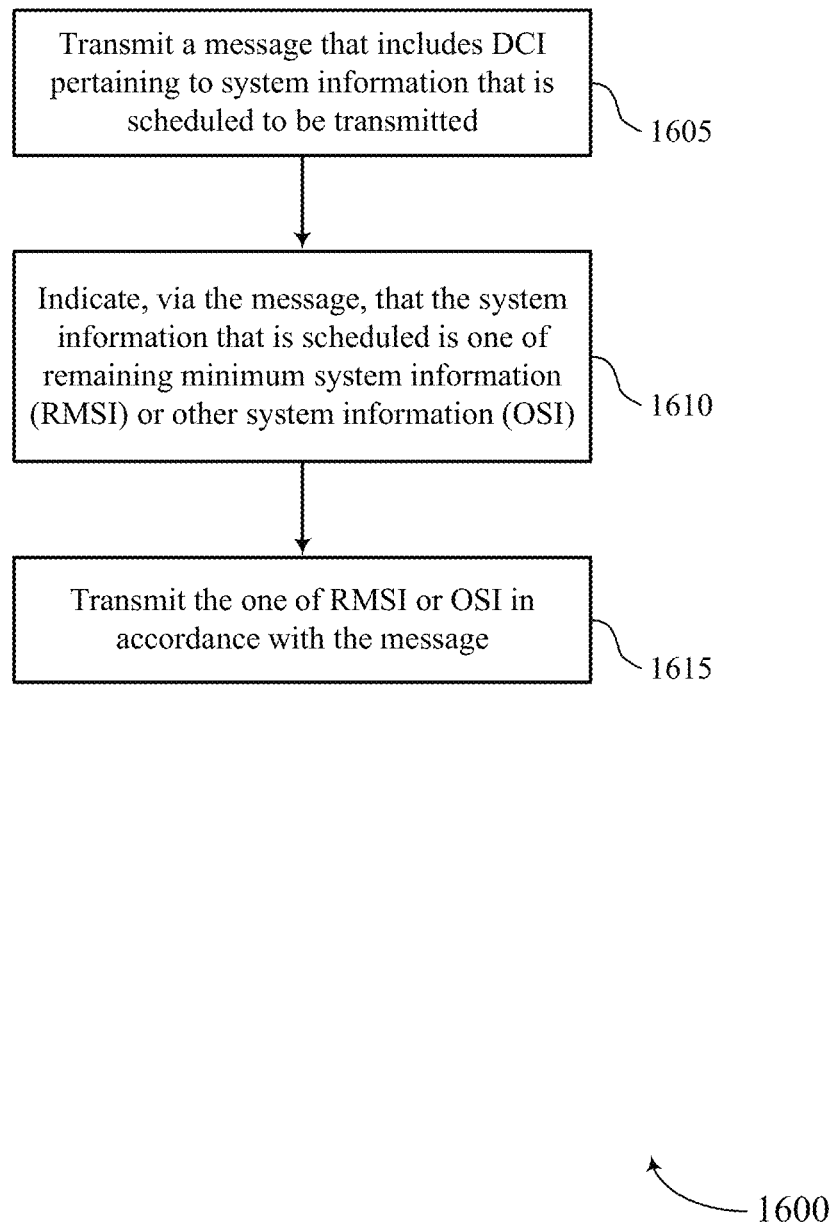

FIG. 16 shows a flowchart illustrating a method 1600 that supports resource mapping for broadcasted system information in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1605, the base station may transmit a message that includes DCI pertaining to system information that is scheduled to be transmitted. The operations of 1605 may be performed according to the methods described herein. In some examples, aspects of the operations of 1605 may be performed by a control channel component as described with reference to FIGS. 11 through 14.

At 1610, the base station may indicate, via the message, that the system information that is scheduled is one of RMSI or OSI. The operations of 1610 may be performed according to the methods described herein. In some examples, aspects of the operations of 1610 may be performed by a SI component as described with reference to FIGS. 11 through 14.

At 1615, the base station may transmit the one of RMSI or OSI in accordance with the message. The operations of 1615 may be performed according to the methods described herein. In some examples, aspects of the operations of 1615 may be performed by a SI component as described with reference to FIGS. 11 through 14.

Figure 17:
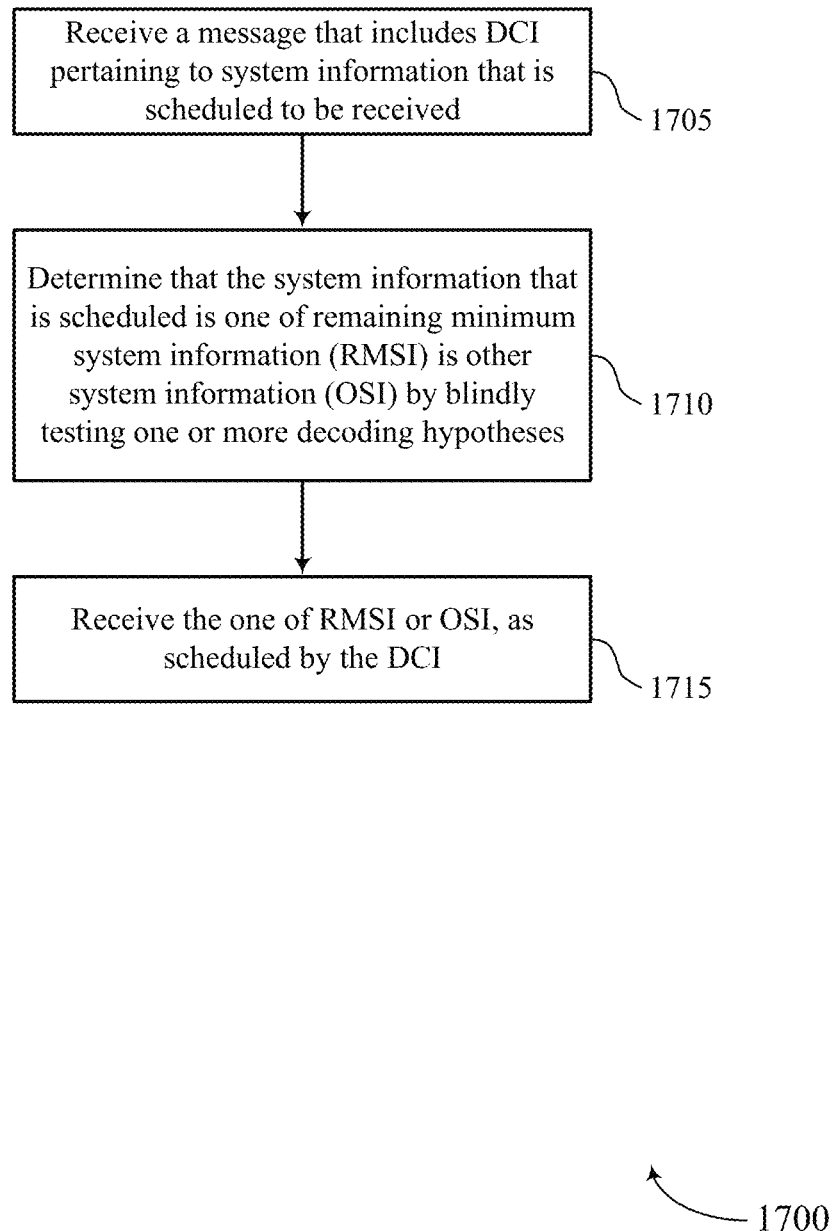

FIG. 17 shows a flowchart illustrating a method 1700 that supports resource mapping for broadcasted system information in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive a message that includes DCI pertaining to system information that is scheduled to be received. The operations of 1705 may be performed according to the methods described herein. In some examples, aspects of the operations of 1705 may be performed by a control channel component as described with reference to FIGS. 7 through 10.

At 1710, the UE may determine that the system information that is scheduled is one of RMSI or OSI by blindly testing one or more decoding hypotheses. The operations of 1710 may be performed according to the methods described herein. In some examples, aspects of the operations of 1710 may be performed by a blind decoder as described with reference to FIGS. 7 through 10.

At 1715, the UE may receive one of the RMSI or the OSI, as scheduled by the DCI. The operations of 1715 may be performed according to the methods described herein. In some examples, aspects of the operations of 1715 may be performed by a SI component as described with reference to FIGS. 7 through 10.

Figure 18:
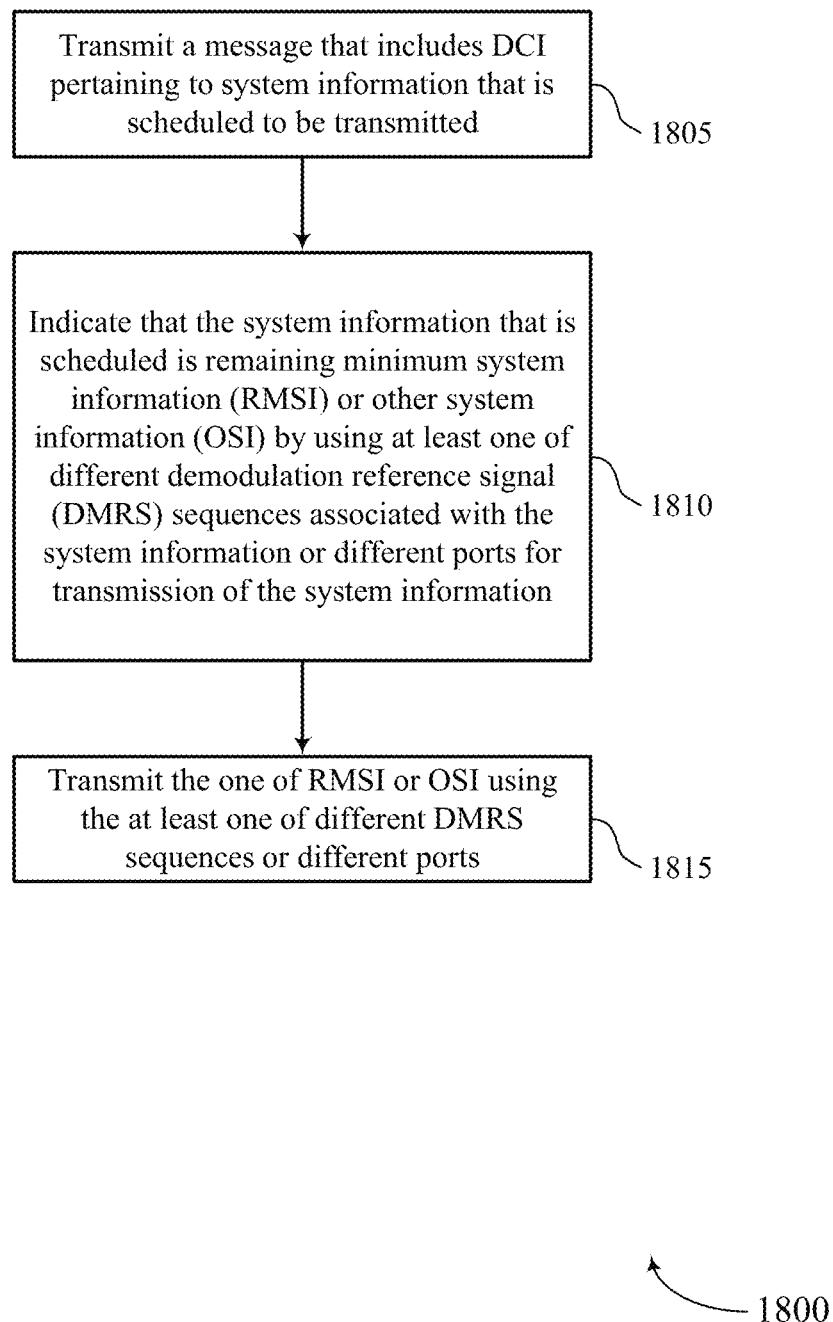

FIG. 18 shows a flowchart illustrating a method 1800 that supports resource mapping for broadcasted system information in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may transmit a message that includes DCI pertaining to system information that is scheduled to be transmitted. The operations of 1805 may be performed according to the methods described herein. In some examples, aspects of the operations of 1805 may be performed by a control channel component as described with reference to FIGS. 11 through 14.

At 1810, the base station may indicate that the system information that is scheduled is one of RMSI or OSI by using at least one of different DMRS sequences associated with the system information or different ports for transmission of the system information. The operations of 1810 may be performed according to the methods described herein. In some examples, aspects of the operations of 1810 may be performed by a SI component as described with reference to FIGS. 11 through 14.

At 1815, the base station may transmit the one of RMSI or OSI using the at least one of different DMRS sequences or different ports. The operations of 1815 may be performed according to the methods described herein. In some examples, aspects of the operations of 1815 may be performed by a DMRS component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a message from a base station that includes downlink control information (DCI) pertaining to system information that is scheduled to be received;
receiving, in the DCI, an indication that the DCI pertains to one of remaining minimum system information (RMSI) or other system information (OSI), wherein the RMSI and OSI are distinguished by a value of the indication;
receiving, in the DCI, an indication of whether the one of the RMSI or the OSI is to be received via an interleaved mapping, the one of the RMSI or the OSI being mapped to a same resource grid or a different resource grid dependent on whether the one of the RMSI or the OSI is to be received via the interleaved mapping; and
searching a downlink bandwidth part for the scheduled one of RMSI or OSI determined from the message.

2. The method of claim 1, wherein the indication that the DCI pertains to one of the RMSI or the OSI is a bit field.

3. The method of claim 2, wherein the bit field is a modulation and coding scheme (MCS) field.

4. The method of claim 1, wherein determining that the system information is the one of RMSI or OSI comprises:
unscrambling the message using a system information radio network temporary identifier (SI-RNTI) of a plurality of SI-RNTIs; and
determining from the SI-RNTI used to unscramble the message, that the DCI pertains to the one of RMSI or OSI.

5. The method of claim 1, wherein receiving the indication of whether the one of the RMSI or the OSI is to be received via the interleaved mapping comprises:

receiving, in the DCI, the indication that the system information is to be received via the interleaved mapping, wherein the system information is mapped to the same resource grid regardless of whether the system information is RMSI or OSI.

6. The method of claim 1, wherein receiving the indication of whether the one of the RMSI or the OSI is to be received via the interleaved mapping comprises:
receiving, in the DCI, the indication that the system information is to be received without the interleaved mapping, wherein the system information is mapped to the different resource grid depending on the system information being the one of RMSI or OSI.

7. The method of claim 1, wherein receiving the message that includes the DCI pertaining to system information comprises:
receiving the message as part of a procedure to update already received system information.

8. The method of claim 1, further comprising:
identifying a reference point for resource block (RB) bundling for the system information regardless of whether the system information is the RMSI or the OSI, wherein the reference point is RB zero of an initial active downlink bandwidth part; and
searching the initial active downlink bandwidth part for the scheduled one of RMSI or OSI determined from the message based at least in part on identifying the reference point for RB bundling.

9. An apparatus for wireless communication, comprising:
a processor,
memory in electronic communication with the processor; and
instructions stored in the memory and executable by the processor to cause the apparatus to:
receive a message from a base station that includes downlink control information (DCI) pertaining to system information that is scheduled to be received;
receive, in the DCI, an indication that the DCI pertains to one of remaining minimum system information (RMSI) or other system information (OSI), wherein the RMSI and OSI are distinguished by a value of the indication;
receive, in the DCI, an indication of whether the one of the RMSI or the OSI is to be received via an interleaved mapping, the one of the RMSI or the OSI being mapped to a same resource grid or a different resource grid dependent on whether the one of the RMSI or the OSI is to be received via the interleaved mapping; and
search a downlink bandwidth part for the scheduled one of RMSI or OSI determined from the message.

10. The apparatus of claim 9, wherein the indication that the DCI pertains to one of the RMSI or the OSI is a bit field.

11. The apparatus of claim 10, wherein the bit field is a modulation and coding scheme (MCS) field.

12. The apparatus of claim 9, wherein the instructions to determine that the system information is the one of RMSI or OSI are further executable by the processor to cause the apparatus to:
unscramble the message using a system information radio network temporary identifier (SI-RNTI) of a plurality of SI-RNTIs; and determine from the SI-RNTI used to unscramble the message, that the DCI pertains to the one of RMSI or OSI.

13. The apparatus of claim 9, wherein the instructions to receive the indication of whether the one of the RMSI or the OSI is to be received via the interleaved mapping are further executable by the processor to cause the apparatus to:
receiving, in the DCI, the indication that the system information is to be received via the interleaved mapping, wherein the system information is mapped to the same resource grid regardless of whether the system information is RMSI or OSI.

14. The apparatus of claim 9, wherein the instructions to receive the indication of whether the one of the RMSI or the OSI is to be received via the interleaved mapping are further executable by the processor to cause the apparatus to:
receive, in the DCI, the indication that the system information is to be received without the interleaved mapping, wherein the system information is mapped to the different resource grid depending on the system information being the one of RMSI or OSI.

15. An apparatus for wireless communication, comprising:
means for receiving a message from a base station that includes downlink control information (DCI) pertaining to system information that is scheduled to be received;
means for receiving, in the DCI, an indication that the DCI pertains to one of remaining minimum system information (RMSI) or other system information (OSI), wherein the RMSI and OSI are distinguished by a value of the indication;
means for receiving, in the DCI, an indication of whether the one of the RMSI or the OSI is to be received via an interleaved mapping, the one of the RMSI or the OSI being mapped to a same resource grid or a different resource grid dependent on whether the one of the RMSI or the OSI is to be received via the interleaved mapping; and
means for searching a downlink bandwidth part for the scheduled one of RMSI or OSI determined from the message.

16. A non-transitory computer-readable medium storing code for wireless communication, the code comprising instructions executable by a processor to:
receive a message from a base station that includes downlink control information (DCI) pertaining to system information that is scheduled to be received;
receive, in the DCI, an indication that the DCI pertains to one of remaining minimum system information (RMSI) or other system information (OSI), wherein the RMSI and OSI are distinguished by a value of the indication;
receive, in the DCI, an indication of whether the one of the RMSI or the OSI is to be received via an interleaved mapping, the one of the RMSI or the OSI being mapped to a same resource grid or a different resource grid dependent on whether the one of the RMSI or the OSI is to be received via the interleaved mapping; and
search a downlink bandwidth part for the scheduled one of RMSI or OSI determined from the message.

* * * * *